(12) United States Patent
Singh et al.

(10) Patent No.: US 11,184,479 B2
(45) Date of Patent: Nov. 23, 2021

(54) MOBILE ROAMING AND AUTHENTICATION

(71) Applicant: TATA COMMUNICATIONS (AMERICA) INC., Herndon, VA (US)

(72) Inventors: Azad Singh, Brossard (CA); Kenneth Burgert, Old Bridge, NJ (US); Frederic Paquette, Montreal (CA)

(73) Assignee: TATA COMMUNICATIONS (AMERICA) INC., Herndon, VA (US)

( * ) Notice: Subject to any disclaimer, the term of this patent is extended or adjusted under 35 U.S.C. 154(b) by 30 days.

(21) Appl. No.: 16/072,838

(22) PCT Filed: Mar. 28, 2017

(86) PCT No.: PCT/US2017/024602
§ 371 (c)(1),
(2) Date: Jul. 25, 2018

(87) PCT Pub. No.: WO2017/172813
PCT Pub. Date: Oct. 5, 2017

(65) Prior Publication Data
US 2019/0037071 A1    Jan. 31, 2019

Related U.S. Application Data

(60) Provisional application No. 62/314,641, filed on Mar. 29, 2016.

(51) Int. Cl.
*H04L 12/00*   (2006.01)
*H04M 3/42*    (2006.01)
(Continued)

(52) U.S. Cl.
CPC .... *H04M 3/42289* (2013.01); *H04L 63/0876* (2013.01); *H04L 65/1069* (2013.01);
(Continued)

(58) Field of Classification Search
None
See application file for complete search history.

(56) References Cited

U.S. PATENT DOCUMENTS 7,630,372 B1 *  12/2009  Androski .......... H04L 29/12594
                                               370/349
7,805,161 B1    9/2010   Jones et al.
(Continued)

FOREIGN PATENT DOCUMENTS

EP        0883318 A1    9/1998
WO    2014/130367 A1    8/2014
(Continued)

OTHER PUBLICATIONS

International Search Report for PCT/US2017/024602 dated Aug. 10, 2017.

*Primary Examiner* — Noel R Beharry
*Assistant Examiner* — Lionel Preval
(74) *Attorney, Agent, or Firm* — Resolute Legal PLLC

(57) ABSTRACT

A cost-effective system and method of sending and receiving high quality phone calls over a low-cost network (e.g., a local area network, a WiFi network, etc.) with a wireless device, where such phone calls would typically have been delivered over a cellular network to the wireless device is provided herein. The system enables the wireless device to retain a phone number assigned by its home cellular network to send and receive calls, while still sending and receiving such calls over the low-cost network. The system also enables wireless devices to be authenticated with the home network of the wireless device for purposes other than sending and receiving high-quality phone calls.

19 Claims, 8 Drawing Sheets

(51) Int. Cl.
*H04M 11/06* (2006.01)
*H04W 8/12* (2009.01)
*H04W 76/12* (2018.01)
*H04L 29/06* (2006.01)
*H04M 1/253* (2006.01)
*H04W 8/06* (2009.01)
*H04W 12/06* (2021.01)
*H04W 8/26* (2009.01)
*H04W 60/00* (2009.01)

(52) U.S. Cl.
CPC ......... *H04M 1/2535* (2013.01); *H04M 11/06* (2013.01); *H04W 8/06* (2013.01); *H04W 8/12* (2013.01); *H04W 12/06* (2013.01); *H04W 76/12* (2018.02); *H04M 2203/152* (2013.01); *H04M 2207/18* (2013.01); *H04W 8/26* (2013.01); *H04W 60/00* (2013.01)

(56) References Cited

U.S. PATENT DOCUMENTS

| | | |
|---|---|---|
| 2005/0192035 A1 | 9/2005 | Jiang |
| 2005/0232189 A1 | 10/2005 | Loushine |
| 2006/0046714 A1* | 3/2006 | Kalavade ............... H04M 3/54 |
| | | 455/428 |
| 2006/0142011 A1* | 6/2006 | Kallio ................... H04W 76/11 |
| | | 455/445 |
| 2007/0254648 A1 | 11/2007 | Zhang et al. |
| 2007/0281704 A1 | 12/2007 | Lin et al. |
| 2007/0291733 A1* | 12/2007 | Doran ................... H04L 29/125 |
| | | 370/352 |
| 2009/0010222 A1 | 1/2009 | Jechoux |
| 2009/0129371 A1* | 5/2009 | Bishay ................. H04W 84/042 |
| | | 370/352 |
| 2011/0138483 A1 | 6/2011 | Bravo et al. |
| 2011/0268022 A1 | 11/2011 | Xu |
| 2013/0196696 A1* | 8/2013 | Brittain ............... H04M 3/42102 |
| | | 455/466 |
| 2013/0303161 A1 | 11/2013 | Miranda et al. |
| 2014/0369232 A1 | 12/2014 | Kim et al. |
| 2015/0133116 A1* | 5/2015 | Lauer ................... H04W 12/06 |
| | | 455/435.1 |
| 2016/0142447 A1* | 5/2016 | Mufti ................... H04L 65/1046 |
| | | 370/260 |

FOREIGN PATENT DOCUMENTS

| | | |
|---|---|---|
| WO | 2015/069160 A1 | 5/2015 |
| WO | 2016/196266 A1 | 12/2016 |

* cited by examiner

MOBILE ROAMING AND AUTHENTICATION

CROSS REFERENCE TO A RELATED APPLICATION

This application is a National Stage of International Application No. PCT/US2017/024602 filed on Mar. 28, 2017, which claims priority from U.S. Application 62/314,641, filed on Mar. 29, 2016. The contents of the above documents are which are incorporated herein by reference in their entirety.

SUMMARY OF THE INVENTION

Embodiments disclosed herein provide for a cost-effective system and method of sending and receiving high quality phone calls over a low-cost network (e.g., a local area network, a WiFi network, etc.) with a wireless device, where such phone calls would typically have been delivered over a cellular network to the wireless device. In some embodiments, the system enables a wireless device to receive a call over either a cellular network or a local area network. In some embodiments, the system enables the wireless device to switch between a cellular network and a local area network before, during, or after a call is placed or received. The system enables the wireless device to retain a phone number assigned by its home cellular network to send and receive calls, while still sending and receiving such calls over the local area network. The system also enables wireless devices to be authenticated with the home network of the wireless device for purposes other than sending and receiving high-quality phone calls.

Wireless devices may be carried to many countries, almost anywhere in the world, and provide both voice and data access for a user. When the user (and the user's wireless device) is outside of the user's home cellular network area, the user is said to be "roaming." When a roaming user accesses a cellular network service of a cellular network that is not the user's home network (e.g., a visited network), the charges for accessing such visited network services can be very expensive. Thus, it would be beneficial for the user to be able to use the wireless device while roaming at a lower cost.

In one embodiment, enabling a user to make and receive calls to the user's wireless device over a local area network, such as a WiFi network, allows the user to minimize or avoid accessing the services of a visited cellular network. In one example, when the user's wireless device is within range of a WiFi network, the user's wireless device sends a registration request to a Voice over IP (VoIP) Cloud. The VoIP Cloud may receive the registration request from the wireless device, the initial registration request comprising, among other things, an international subscriber directory number (MSISDN) and an Internet Protocol (IP) address associated with the wireless device. The VoIP Cloud may transmit, to a home location register (HLR) associated with the mobile device, a request for an international mobile subscriber identity (IMSI) based on the MSISDN. The VoIP Cloud may receive a message from the HLR, where the message includes an IMSI and MSISDN associated with the wireless device that was stored in the HLR records. The VoIP Cloud may also receive, from the HLR, a visitor location register (VLR) that the wireless device is currently registered with. The initial VLR is typically a location register associated with a visited mobile network operator/cellular network server provider providing temporary services to the wireless device.

The VoIP Cloud may compare the MSISDN received from the wireless device and the MSISDN received from the HLR. If the two MSISDNs match, the VoIP may determine that the wireless device identity is confirmed. Based on the confirmation of the identity of the wireless device, the VoIP Cloud may perform a geographic look up on the IP address of the wireless device to determine the approximate geographic location of the wireless device. The VoIP Cloud may select an alias phone number from a pool of phone numbers to assign to the wireless device, where the alias phone number is associated with the determined approximate geographic location of the wireless device. The VoIP Cloud may also map or record an association between the selected alias phone number and the IP address of the wireless device. The VoIP Cloud may record that the wireless device is registered with the VoIP Cloud, where the VoIP Cloud serves as a virtual VRL for the wireless device. The VoIP Cloud may transmit, to the HLR, a message that the VoIP Cloud replaces the initial VLR as the current VLR for the mobile device. Thus, when a call is placed to the wireless device and received at the HLR, the HLR can route the call to a telecommunications network associated with the VoIP Cloud rather than the initial VLR or another VLR associated with another cellular network provider. When the VoIP Cloud receives the call for the wireless device, the VoIP Cloud causes the call to be routed to the wireless device to the local area network based on the IP of the wireless device.

DETAILED DESCRIPTION OF THE INVENTION

Figure 1:
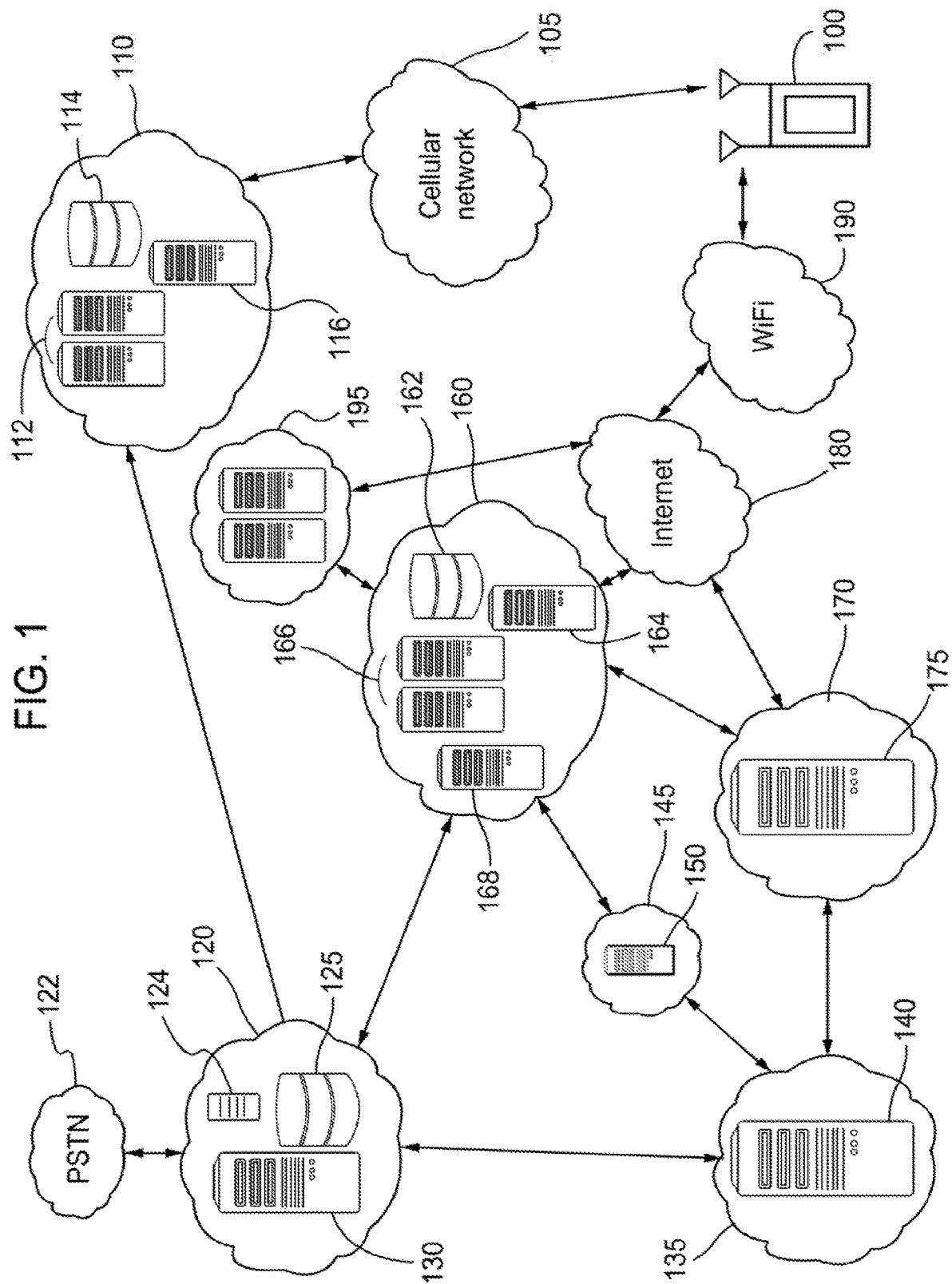
FIG. 1 is a diagrammatic view of one embodiment of a network system configured to transmit and receive wireless calls over different networks.

FIG. 1 is a diagrammatic view of one embodiment of a network system adapted to transmit and receive wireless calls over different networks when a user is outside of the range of the user's home cellular network.

Computing device 100 may include, among other things, wireless devices or wireless remote terminals, such as a mobile device or a computer that can communicate over cellular networks and WiFi networks. For purposes of discussion, computing device 100 may hereinafter be referred to as a Wireless Device 100. Wireless Device 100 may include the ability to access cellular networks run by Mobile Network Operators (MNO) such as Cellular Carrier Network 105. In one embodiment, the Cellular Carrier Network 105 may include cellular networks such as GSM or CDMA based networks. It should be appreciated that Cellular Carrier Network 105 may be any suitable carrier based network. Wireless Device 100 may transmit and receive voice calls as well as data over Cellular Carrier Network 105. Wireless Device 100 may also include the ability to access Wireless Networks 190. In one embodiment, the Wireless Networks 190 includes WiFi based networks. The Wireless Networks 190 may be public based WiFi networks or private based WiFi networks. In one embodiment, the Wireless Networks 190 may include Bluetooth based networks. It should be appreciated that Wireless Networks 190 may be any suitable local or close range network access.

As shown in FIG. 1, Cellular Carrier Network 105 may communicate with a visited location register (VLR) 110. The communication may occur using standard telephony communication protocols such as SS7. The VLR 110 may include one or more servers 112 that provide different type of services, such as registration and voice mail. VLR 110 may include one or more databases 114 that store data related to the services provided by server 112. For example, the databases 114 may store registration information related to wireless devices that are using network services of Cellular Carrier Network 105. VLR 110 may include one or more session border controllers (SBC) 116. The SBC 116 may exert control over signaling traffic related to phone calls as well as the media streams involved in setting up, conducting, and tearing down telephone calls or other interactive media communications. It should be appreciated that the VLR 110 may include any suitable number of different components to operate a VLR. While not shown, it should be appreciated that VLR 110 may be in communication with any number of other location registers associated with other networks and other telephony network operators.

As shown in FIG. 1, the VLR 110 may communicate with a Home MNO 120 that includes at least one Home Location Register (HLR) 130. The communication may occur using standard telephony communication protocols such as SS7. The HLR 130 may include one or more servers that provide different type of services, such as registration for wireless devices like Wireless Device 100. HLR 130 may include one or more databases 125 that store data related to the registration services. For example, the databases 125 may store registration information related to wireless devices that are using network services of a cellular network (like Home MNO 120) associated with the HLR 130. While not shown, HLR 130 may include one or more Session Border Controllers (SBCs). It should be appreciated that the HLR 130 may include any suitable number of different components to operate the HLR 130. Home MNO 120 may include any suitable number of network elements necessary to operate a cellular network, such as a telephone switch and media switch 124 capable of communicating with TDM or IP networks to transmit voice signaling, voice calls, and other data. While not shown, it should also be appreciated that HLR 130 may be in communication with any number of other location registers associated with other telephony networks (whether cellular or fixed line) and other telephony network operators. Home MNO 120 may be in communication with a Public Switched Telephone Network (PSTN) 122 to send and receive voice calls and other data.

Point of Presence (POP) 135 is an access point to a TDM and/or IP based network. POP 135 may be a physical location that includes servers, routers, switches, among other network elements. In one such embodiment, POP 135 includes Network Element 140 such as a telephony switch or a media switch capable of communicating with TDM or IP networks to transmit voice calls. Network Element 140 may be in communication Routing System 145. Network Element 140 may also be in communication with one or more other POPs, such as POP 170. While not shown, it should be appreciated that POP 135 may be in communication with any number of other POPs associated with other networks and other network operators in order to terminate (i.e., connect call traffic to any network operator around the world). POP 135 (and in this case, Network Element 140) may also be in communication with public and private networks. For example, Network Element 140 may be communication with the Internet 180 and a PSTN 122. Network Element 140 may be in communication with Home MNO 120 and any number of other telephony networks. Theses communications may occur using standard telephony communication protocols such as SS7. It should be appreciated that Network Element 140 may herein alternatively referred to as Telephony Switch 140 or Media Switch 140.

Routing System 145 is an intelligent network system that determines how and where to route a call based on numerous parameters (e.g., quality of a destination, cost of a particular destination, predefined routes associated with a calling party, etc.). Routing System 145 may be in communication with Network Element 140. While not shown, Routing System 145 may be in communication with any number of authorized network elements, including network element 175. Routing System 145 may include a network policy and routing management server, such as server 150. Server 150 can perform decision analysis for network policy and route management such as toll-free routing, least-cost routing, number portability, voice VPN, SIP trunking, centralized dial plans, emergency services, etc. In some embodiments (not shown), Routing System 145 may divide the work of network policy and route management over numerous servers. Routing System 145 may also be in communication with Voice over IP (VoIP) Cloud 160. Routing System 145 may also be in communication with any suitable number of VLRs (not shown) to obtain information regarding the location of call termination end points such as Wireless Device 100.

Point of presence (POP) 170 is an access point to a TDM and/or IP based network. POP 135 may be a physical location that includes servers, routers, switches, among other network elements. In one such embodiment, POP 170 includes network element 175 such as a telephony switch or a media switch capable of communicating with TDM or IP networks. Network element 170 may be in communication with Routing System 145. Network element 175 may also be in communication with one or more other POPs, such as POP 135. While not shown, it should be appreciated that POP 170 may be in communication with any number of other POPs associated with other networks and other network operators in order to terminate calls (i.e., connect voice call traffic to any network operator around the world). POP 170 (and in this case, network element 175) may be in communication with the VoIP Cloud 160. Network element 170 may also be in communication with the public and private networks. For example, network element 170 may be communication with the Internet 180 and a PSTN 122 for transmitting and receiving voice media traffic, such as Voice over IP (VoIP) media data. Network Element 170 may be in communication with Home MNO 120 and any number of other telephony networks. Theses communications occur using standard telephony communication protocols such as SS7.

As shown in FIG. 1, the VoIP Cloud 160 may include one or more web servers 164. The webservers 164 may be specially programmed to expose certain functions or functionality of all or some of the VoIP Cloud 160 to other systems or external system associated with other parties. For example, the webservers 164 may include an application programming interface (API) that receives data and requests to perform functions described herein in connection with the VoIP Cloud 160. The API may permit external parties to interact with the VoIP Cloud 160 without purchasing and maintaining expensive telecommunications equipment. The VoIP Cloud 160 may receive and process API requests over an IP based network, such as the Internet 180 or private networks. The VoIP Cloud 160 may include one or more servers 166 that provide different type of services, such as registration, SMS, voice mail, user status, wireless device status, location tracking, call transfer, placing calls on hold, conferencing, ring tones, announcements, etc. In one embodiment, a single server 166 may handle all of these services. In an alternative embodiment, a plurality of servers 166 may be configured to handle these functions using parallel processing.

In another embodiment, the different functions of VoIP Cloud 160 may be divided such that several servers 166 each handle one or more of the functions. VoIP Cloud 160 may include a virtual VLR server (VVLR) 168. The VVLR 168 in the VoIP Cloud 160 is specially programmed to encapsulate the functionality of a traditional HLR and VRL used by cellular carrier networks with the additional features described herein. VoIP Cloud 160 may include one or more databases 162 that store data related to the services provided by servers 164, 166, and 168. For example, the databases 162 may store registration information related to wireless devices that are using network services of a network associated with the VoIP Cloud 160. In one embodiment, databases 162 may store registration information related to wireless devices that are using network services of a network not associated with the VoIP Cloud. While not shown, VoIP Cloud 160 may include one or more SBCs. It should be appreciated that the VoIP Cloud 160 may include any suitable number of different components to operate the VoIP Cloud 160.

As shown in FIG. 1, the VoIP Cloud 160 may communicate with numerous different systems and networks. For example, the VoIP Cloud 160 may communicate with the HLR 130 (using VVLR 168 or the functionality of the VVLR 168). The VoIP Cloud 160 may also communicate with the POPs 170 and 135 and any number of other telephony networks and telephony network elements. The VoIP Cloud 160 communicates with these network elements using a standard telephony communication protocol, such as SS7. The VoIP Cloud 160 may also communicate with the Routing System 145 as well as to other devices and systems connected through the Internet. The VoIP Cloud 160 may communicate with these network elements using a standard network communication protocol suite, such as TCP/IP. While not shown, it should be appreciated that VoIP Cloud 160 may be in communication with any number of other location registers associated with other networks and other Mobile Network Operators. It should be appreciated that the VoIP Cloud 160 is a specially configured server that extends the functionality of traditional cellular network operator equipment, that can communicate with cellular and IP based networks, and that can provide specialized translations of messaging between the cellular and IP based networks that were not previously available. In addition to interacting with cellular and IP based networks, the VoIP Cloud 160 may be used to translate communications between these networks in ways that did not previously exist. For example, the VoIP Cloud 160 may translate SIP requests from an IP network into SS7 requests bound for a traditional phone network or a wireless cellular carrier network. The VoIP Cloud 160 operates seamlessly with these traditional telephony networks in such a way that the traditional telephony network elements do not require any additional equipment to be interoperable with the VoIP Cloud 160.

Moreover, the VoIP Cloud 160 may perform geographic lookups on IP addresses (GeoIP lookups) associated with wireless devices, such as Wireless Device 100. The VoIP Cloud 160 uses the GeoIP lookup results to determine the approximate geographic location of the Wireless Device 100. The VoIP Cloud 160 may use the approximate geographic location of the Wireless Device 100 to determine an alias phone number to assign to the Wireless Device 100 from a pool of available alias phone numbers, where the alias phone number is associated with the geographic location of the Wireless Device 100. The VoIP Cloud 160 may map the selected alias phone number to an IP address associated with the Wireless Device 100. The VoIP Cloud 160 may store this mapping in a database, such as databases 162. This mapping allows calls to be sent and received to the Wireless Device 100's MSISDN, get translated to the alias phone number for routing within a telephony network associated with VoIP Cloud 160, and then delivered to the Wireless Device 100 over a low-cost network.

In one embodiment, all of the functions of VoIP Cloud 160 handled by the various servers 164, 166, and 168 may be configured into one or multiple servers that can be specially configured to perform all of the above described functionality. For purposes of discussion herein, VoIP Cloud 160 may be used to refer to the system comprising the servers 164, 166, and 168, and databases 162 as well as the functions performed by these servers and databases.

Further details of techniques used in furtherance of the foregoing are described in commonly owned WO Pub. No. 2016/196266, which is assigned to the same assignee as the present application. The disclosure of WO Pub. No. 2016/196266 is hereby incorporated by reference in its entirety.

Turning now to one embodiment of an operation of the system of FIG. 1. Wireless Device 100 is typically associated with a home cellular network run by an MNO (such as Home MNO 120 in FIG. 1). Wireless Device 100 is often associated with the home cellular network through some type of contract. The contract may be a pre-paid (or pay as you go) type contract or a monthly contract. The association between Wireless Device 100 and the home cellular network may be through some other suitable relationship. In either case, the MNO that runs the home cellular network is the primary point of contact for the Wireless Device 100. In such a case, Wireless Device 100 will be registered with the home cellular network's (or Home MNO 120) Home Location Register (HLR), such as HLR 130. For the registration of Wireless Device 100, the HLR may store information associated with the Wireless Device 100 such as a Mobile Station International Subscriber Directory Number (MSISDN), International Mobile Subscriber Identity (IMSI), call forwarding information, voice mailbox number, ring tones, missed call alerts, etc. The HLR registration information associated with the Wireless Device 100 is shared with other voice telecommunications operators (such as mobile and fixed line telephony operators). When a caller attempts to call Wireless Device 100, the caller's telecommunications network will first try to send the call to the Wireless Device 100's home cellular network based on the registration information in HLR 130.

When Wireless Device 100 is not within range of the home cellular network, but is within range of one or more other cellular networks to make/receive calls or transmit/receive data, these one or more other cellular networks are considered "visited" networks. When Wireless Device 100 accesses the services of a visited network, Wireless Device 100 is considered roaming or using roaming services. Visited networks within range of the user's wireless device often permit roaming devices to access and use their network services (e.g., to send/receive calls and transmit/receive data). For example, a user associated with Wireless Device 100 is a registered subscriber to an MNO in Toronto, Canada. If the user travels to Washington, D.C. and attempts to use Wireless Device 100 and the MNO from Toronto Canada does not provide network access in Washington, D.C., the Wireless Device 100 must rely on an alternative cellular network in Washington, D.C. provided by another MNO. In this example, the alternative cellular network in Washington, D.C. is considered a visited network for Wireless Device 100.

In order to provide roaming services to Wireless Device 100, the visited network in Washington, D.C. must be capable of working with the MNO from Toronto, Canada. That is, if Wireless Device 100 is to use the roaming services provided by the MNO in Washington, D.C., the MNO in Washington, D.C. must have some way of coordinating with the MNO in Toronto, Canada to insure proper authentication, billing, call routing, etc. (i.e., the MNO in Toronto, Canada will reimburse the MNO in Washington, D.C. for the network services that Wireless Device 100 uses while in Washington, D.C.).

One way in which roaming is authorized is that the Wireless Device 100 is detected by a visited network, for example, Cellular Carrier Network 105 in Washington, D.C. When the Cellular Carrier Network 105 obtains enough information from Wireless Device 100 to ascertain the identity of the home network associated with the wireless device. The VLR associated with the Cellular Carrier Network 105, such as VLR 110, contacts the HLR 130 and requests confirmation that Wireless Device 100 is authorized to roam on Cellular Carrier Network 105 (i.e., the MNO associated with HLR 130 will pay the MNO associated with VLR 110 for network services used by Wireless Device 100). For purposes of explanation, we assume herein that the HLR 130 is a part of the home network, although it may be physically separate. Once HLR 130 confirms to the VLR 110 that Wireless Device 100 is authorized to use the roaming services of the MNO in Washington D.C., the VLR 110 will inform the appropriate network elements in Cellular Carrier Network 105 that Wireless Device 100 is authorized to access and use Cellular Carrier Network 105. The MNO associated with HLR 130 and the MNO associated with VLR 110 will subsequently settle any accumulated charges for network services that Wireless Device 100 used while in Washington, D.C. on the visited network. The Home MNO 120 may then bill the user of Wireless Device 100. A similar authorization process occurs between other cellular networks/VLRs when Wireless Device 100 attempts to use the services of these other cellular networks. It should be appreciated that roaming charges tend to be very expensive for many users. This arises, among other reasons, because MNOs must build and maintain an expensive and complex cellular network infrastructure to support wide spread cellular network access. The visited MNOs therefore must charge high fees for the privilege of providing temporary access to and usage of the visited networks' network services. Also, there were previously no easy and low cost alternatives to using a visited MNO's network to send and receive calls using the Wireless Device 100's regular phone number (e.g., the MSISDN assigned by Home MNO 120). Thus, it would be beneficial for a user of Wireless Device 100 to be able to use Wireless Device 100 while roaming at a lower cost. In one embodiment, the wireless device may transmit and receive calls while the wireless device is in range of a lower cost network such as a WiFi network, which avoids the expensive visited MNO roaming charges.

In one embodiment of the system of FIG. 1, Wireless Device 100 registers with the VoIP Cloud 160 to transmit and receive calls over a WiFi network. In some embodiments, Wireless Device 100 communicates with the VoIP Cloud 160 through a WiFi network and the public Internet. In other embodiments, Wireless Device 100 communicates with the VoIP Cloud 160 through a WiFi network, the public Internet, and other private networks (or some combination of the above networks). In one such embodiment, when Wireless Device 100 detects that it is within range of a WiFi network (such as WiFi Network 190), the Wireless Device 100 is specially configured to initiate a registration process with the VoIP Cloud 160 (including initiating the registration process with the VVLR 168). The VoIP Cloud 160 informs (e.g., through the VVLR 168) the HLR 130 that the subscriber is now roaming and is registered in the VoIP Cloud 160. In some embodiments, the HLR 130 may send a message to the VoIP Cloud 160 to cancel the registration with the VoIP Cloud 160 (such as a "Cancel Location" message) in case of a collision between the device registering with a Cellular Carrier Network 105 and also registering with the VoIP Cloud 160.

In one embodiment, while a subscriber is outside of the range of the subscriber's home network (e.g., when the subscriber turns on Wireless Device 100 or the Wireless Device 100 is within range of Cellular Carrier Network 105), the Wireless Device 100 registers with Cellular Carrier Network 105. The registration procedure may rely on the standard registration procedures for a wireless device registering with a visited GSM or a CDMA network.

If the Wireless Device 100 moves to a position that is within range of WiFi Network 190, Wireless Device 100 attempts to register with the VoIP Cloud 160. Wireless Device 100 sends a request to the VoIP Cloud 160 to register. When the VoIP Cloud 160 detects the request, VoIP Cloud 160 sends a request to the VVLR 168 with a registration request that includes, among other data, the MSISDN of the Wireless Device 100. The request message from the VoIP Cloud 160 may be in the form of an HTTPS (SUB REG) to the VVLR 168. However, the request message may be in any suitable format.

The VVLR 168 reviews its records to determine whether the Wireless Device 100 is already registered with the VVLR 168. If Wireless Device 100 is not already registered, then the VVLR 168 communicates with the HLR 130 to update the Wireless Device 100's registration with its home network. In one embodiment, the VVLR 168 sends a "Send IMSI" request to the HLR 130 using the MSISDN of the Wireless Device 100. However, the request message may be in any suitable format. If the message from the VVLR 168 is successfully received, the HLR 130 sends a response back to the VVLR 168 with the IMSI and MSISDN of the Wireless Device 100 that HLR 130 stored in its records. The VVLR 168 then sends an "Any Time Interrogation" request to the HLR 130 with the received IMSI. HLR 130 returns the current VLR information to the VVLR 168. In this case, the current VLR information is the VLR 110. The VVLR 168 stores the VLR 110 information for later use. The VVLR 168 sends a message to the HLR 130 with information about the VVLR 168 and an indication that the VVLR 168 is now the current VLR for Wireless Device 100. In one embodiment, the message may be in the form of an "Update Location" message. However, any suitable message format may be used. If the registration of the Wireless Device 100 is successful, the VVLR 168 sends a message, such as a "200 OK" to the VoIP Cloud 160. This message tells the VoIP Cloud 160 that the Wireless Device 100 may send and receive voice calls using the WiFi Network 190. If the registration of the Wireless Device 100 is not successful, the VVLR 168 sends a message, such as an error message, to the VoIP Cloud 160 and the Wireless Device 100 is prevented from making and receiving voice calls over the WiFi Network 190.

In one embodiment, if the Wireless Device 100 moves out of range of the WiFi Network 190 to which Wireless Device 100 is registered, the VoIP Cloud 160 sends a message to the HLR 130 indicating that the VVLR 168 is no longer the registered VLR for Wireless Device 100 (i.e., the Wireless Device 100 is deregistered from VoIP Cloud 160). For example, the VoIP Cloud 160 may send an Update Location message to the HLR 130. In one embodiment, if there is a collision or conflict between the Wireless Device 100 attempting to register with the VVLR 168 and a VLR of a cellular network (such as VLR 110) at the same time or substantially close in time, the VoIP Cloud 160 may send may send an update location message to the HLR 130. If the VVLR 168 already sent an Update Location message to the HLR 130 for the Wireless Device 100 (due to the VoIP Cloud 160 or the VVLR 168 determining that Wireless Device 100 was out of range of a WiFi network), the HLR 130 will send a cancel location message to the VVLR 168 for the Wireless Device 100. Upon receiving the message from the HLR 130, the VVLR 168 will remove the Wireless Device 100 from its register/database or otherwise update the Wireless Device 100's status as not registered at the VVLR 168 (or VoIP Cloud 160).

One such embodiment of the Wireless Device 100 moving out of range of the WiFi Network 190 and becomes deregistered from VoIP Cloud 160 is described below. Wireless Device 100 moves out of communication range of the WiFi Network 190. The VoIP Cloud 160 sends an update location message to the HLR 130 indicating that the device is registered with a new VLR. HLR 130 will transmit an Update Location message to the VoIP Cloud 160 (or VVLR 168) including information associated with the Wireless Device 100. VVLR 168 receives this message and may analyze its records to see if Wireless Device 100 is still within range of a WiFi network (such as WiFi Network 190) and/or whether Wireless Device 100 is still registered with the VVLR 168. If Wireless Device 100 is not registered with the VVLR 168, the VVLR 168 will accept the message and not take further action. On the other hand, if Wireless Device 100 is still registered with the VVLR 168 (e.g., the Wireless Device 100 is still within range of a WiFi network, such as WiFi Network 190), the VVLR 168 will accept the message and then transmit an update location message to the HLR 130 indicating that VVLR 168 is the current VLR location for Wireless Device 100.

In one embodiment, the Wireless Device 100 is periodically or continuously communicating with either the VoIP Cloud 160 or the VVLR 168 using keep alive messages. In one embodiment, the keep alive time period is small enough that the status of the Wireless Device 100 can be determined with respect to proximity to a WiFi network. In one embodiment, the VoIP Cloud 160 (or the VVLR 168) can frequently send ping messages to Wireless Device 100 to determine the status of Wireless Device 100 as well as the proximity of the Wireless Device 100 to a WiFi network.

In one embodiment, if the Wireless Device 100 moves out of range of the WiFi Network 190 to which Wireless Device 100 is registered, the VoIP Cloud 160 may update the status of the Wireless Device 100. In one embodiment, the VoIP Cloud 160 de-registers Wireless Device 100 from the VVLR 168. The VVLR 168 also may inform the HLR 130 that Wireless Device 100 is no longer using the VoIP Cloud 160. Furthermore, in one embodiment, Wireless Device 100 may assume that it is registered with a cellular network (e.g., a GSM based network) VLR (while it is actually registered with the VVLR 168). In such an embodiment, VoIP Cloud 160 does not send a location update request to the HLR 130 until a particular time period has passed. This could result in the Wireless Device 100 being in limbo (e.g., unable to properly send/receive calls or transmit/receive data) with the HLR 130 for incoming calls unless the Wireless Device 100 makes an outgoing call or the VoIP Cloud 160 (VVLR 168) directs the HLR 130 to point to a different VLR. Such a situation can be mitigated in accordance with the following procedure.

In one embodiment, if the Wireless Device 100 moves out of range of the WiFi Network 190 to which Wireless Device 100 is registered, the VoIP Cloud 160 may detect that Wireless Device 100 is not within range of a WiFi network (such as WiFi Network 190). A server in VoIP Cloud 160 may send a message to VVLR 168 to deregister Wireless Device 100 in the VVLR 168 records. The message may be in the form of a sub_deregister message. VVLR 168 may mark Wireless Device 100 as de-registered and wait for a timeout or a predetermined time period to see if a cancel location message is received from HLR 130 associated with Wireless Device 100. If the cancel location message is received from HLR 130, VVLR 168 may mark Wireless Device 100 as deregistered and close any open session with Wireless Device 100. If no cancellation location message is received from HLR 130, VoIP Cloud 160 (through VVLR 168) may send a request message to a VLR to provide a roaming number (such as a Mobile Application Part Provide Roaming Number (MAP PRN) message). The VLR selected to receive this message is the last known VLR that VVLR 168 stored in association with Wireless Device 100 before VVLR 168 became the VLR of record with the HLR 130.

While the subscriber is registered with the VoIP Cloud 160 and VVLR 168, all incoming call requests to the MSISDN associated with Wireless Device 100 will be forwarded to the VoIP Cloud 160 for processing. In one embodiment, while Wireless Device 100 is in a visited network, an appropriate temporary local number associated with Wireless Device 100 may be provided to the HLR 130. This allows HLR 130 to cause a call (directed to Wireless Device 100) to be forwarded to Wireless Device 100 at the correct location on the correct visited network. An appropriate local number allows for a least cost route (LCR) to be applied to a call to Wireless Device 100.

One embodiment of mobile device 100 receiving a call over a WiFi Network 190 is illustrated below, where the Wireless Device 100 registered with the VoIP Cloud 160 and VVLR 168. HLR 130 receives an incoming call request destined to Wireless Device 100. The HLR 130 reviews its records associated with Wireless Device 100 and determines that Wireless Device 100 is not using a home cellular network associated with HLR 130. HLR 130 also determines from its records that Wireless Device 100 is registered with a visited network. In this embodiment, HLR 130's records indicate that Wireless Device 100 is registered with VVLR 168. The HLR 130 may send a Provide Roaming Number (PRN) request to VVLR 168. VVLR 168 checks its records database to see if Wireless Device 100 is still registered with VoIP Cloud 160 (e.g., the VVLR 168 determines if Wireless Device 100 is within range of a WiFi network, such as WiFi Network 190). If Wireless Device 100 is not registered with VoIP Cloud 160, the VVLR 168 responds to the HLR 130 with an error code such as an "Absent Subscriber" error code. If Wireless Device 100 is registered with VoIP Cloud 160, VVLR 168 may obtain an appropriate temporary local number service (LNS) number for Wireless Device 100 based upon the approximate geographical location of Wireless Device 100 and any other suitable factors used to assign a local number to a visiting wireless device. As noted above, the approximate geographic location of Wireless Device 100 may be based on a GeoIP lookup of an IP address of Wireless Device 100. As noted above, in one embodiment, the temporary LNS number may be a temporary mobile station roaming number (MSRN), temporary alias phone number, or a temporary number that is not typically a routable phone number. The VVLR 168 may map the temporary LNS number to an IP address of the Wireless Device 100. VVLR 168 sends this LNS number to the HLR 130. The message to the HLR 130 may indicate the LNS number for Wireless Device 100 as a Roaming Number, which is the number used to forward a call to Wireless Device 100 when roaming and using the VoIP Cloud 160 as a visited network.

HLR 130 may then cause the call to be forwarded to Telephony Switch 140 at POP 135 based on the provided LNS number. In one embodiment, Telephony Switch 140 may be in a telephony network associated with VoIP Cloud 160. Telephony Switch 140 may determine whether it is within geographic proximity to Wireless Device 100. If Telephony Switch 140 determines that it is within geographic proximity to Wireless Device 100, Telephony Switch 140 forwards the call to Wireless Device 100 over the Internet 180. While Wireless Device 100 is within range of a WiFi Network 190, WiFi Network 190 will receive the call data from Internet 180 and forward the call to Wireless Device 100. It should be appreciated that the WiFi network could be any suitable WiFi network that is in communication with the Internet 190.

In one embodiment, if Telephony Switch 140 determines that it is not within geographic proximity to Wireless Device 100, Telephony Switch 140 may transmit a request to the Routing Server 150 via Routing System 145 to determine the geographic location of Wireless Device 100. In one embodiment, the Routing System 145 may determine the geographic location and visited network of Wireless Device 100 using its routing table database. In one embodiment, Routing System 145 may transmit a request to VoIP Cloud 160 to provide the geographic location of Wireless Device 100. VoIP 160 may transmit a message back to Routing System 145 with the geographic location of Wireless Device 100. Routing System 145 may determine the best telephony switch and/or POP to forward the call to. Alternatively, Routing System 145 may transmit the geographic location of Wireless Device 100 to Telephony Switch 140 and allow Telephony Switch 140 to determine the best telephony switch and/or POP to forward the call to. In the embodiment illustrated in FIG. 1, Routing System 145 determines that Wireless Device 100 is within closest geographic proximity to POP 170. Thus, Telephony Switch 140 forwards the call to telephony switch 175 in POP 170. Telephony switch 175 then forwards the call to Wireless Device 100 over the Internet 180. While Wireless Device 100 is within range of a WiFi Network 190, WiFi Network 190 will receive the call data from Internet 180 and forward the call to Wireless Device 100.

In one embodiment, where Wireless Device 100 is not registered with the VoIP Cloud 160 (and VVLR 168), but the HLR 130 still has VVLR 168 as the current VLR, the VVLR 168 may send back an error message to the HLR 130. The error message may be in the form of a User Error message in an ACK message to the HLR 130.

In one embodiment, when Wireless Device 100 is registered with the VoIP Cloud 160/VVLR 168, VoIP Cloud 160 will also forward and receive short message service (SMS) messages for Wireless Device 100. In one embodiment, Wireless Device 100 may have an application to receive SMS messages transmitted through VoIP Cloud 160. In one embodiment, Wireless Device 100 may ascertain if the destination for the SMS message is for a number that is outside of a network associated with VoIP Cloud 160 (e.g., an OFFNET number) or whether the destination is for a number that is located within a network associated with the VoIP Cloud 160 (e.g., an ONNET number). If the destination is ONNET, the VoIP Cloud 160 will transmit the SMS message via the associated network to the appropriate destination. If the destination is OFFNET, then the VoIP Cloud 160 will send the SMS to the appropriate destination number using the Internet 180 and/or a telephony network that typically handles the SMS messages.

In one embodiment, once Wireless Device 100 is no longer registered with the VoIP Cloud 160 (and VVLR 168), Wireless Device 100 will receive SMS messages over a connected cellular network (e.g., a GSM, CDMA, etc. based network) as usual.

One embodiment of VoIP Cloud 160 sending and receiving SMS messages is described below. Wireless Device 100 enters WiFi Network 190 and registers with the VoIP Cloud 160. VoIP Cloud 160 may provide information on Wireless Device 100 to the VVLR 168 for roaming activation on a low-cost network (such as WiFi Network 190) as discussed above. VVLR 168 initiates and establishes Wireless Device 100 registration with HLR 130. Another wireless device sends an SMS message to the Wireless Device 100. The other wireless device initiates the SMS message which is received by a server configured to handle SMS messages from the other wireless devices (e.g., a short message server center (SMSC)). The SMSC may send an SRI-for-SM to the HLR 130. HLR 130 may respond with the information associated with VVLR 168. The SMSC then forwards a MT-Forward-SM message to the VVLR 168. VVLR 168 may forward the SMS message to the Wireless Device 100 via the VoIP Cloud 160, Internet 180, and WiFi Network 190 using an SMS API for VoIP Cloud 160. VoIP Cloud 160 transmits the status of delivery of the SMS message to the Wireless Device 100 to VVLR 168. VVLR 168 then transmits a MT-Forward-SM ACK to the SMSC.

Figure 2:
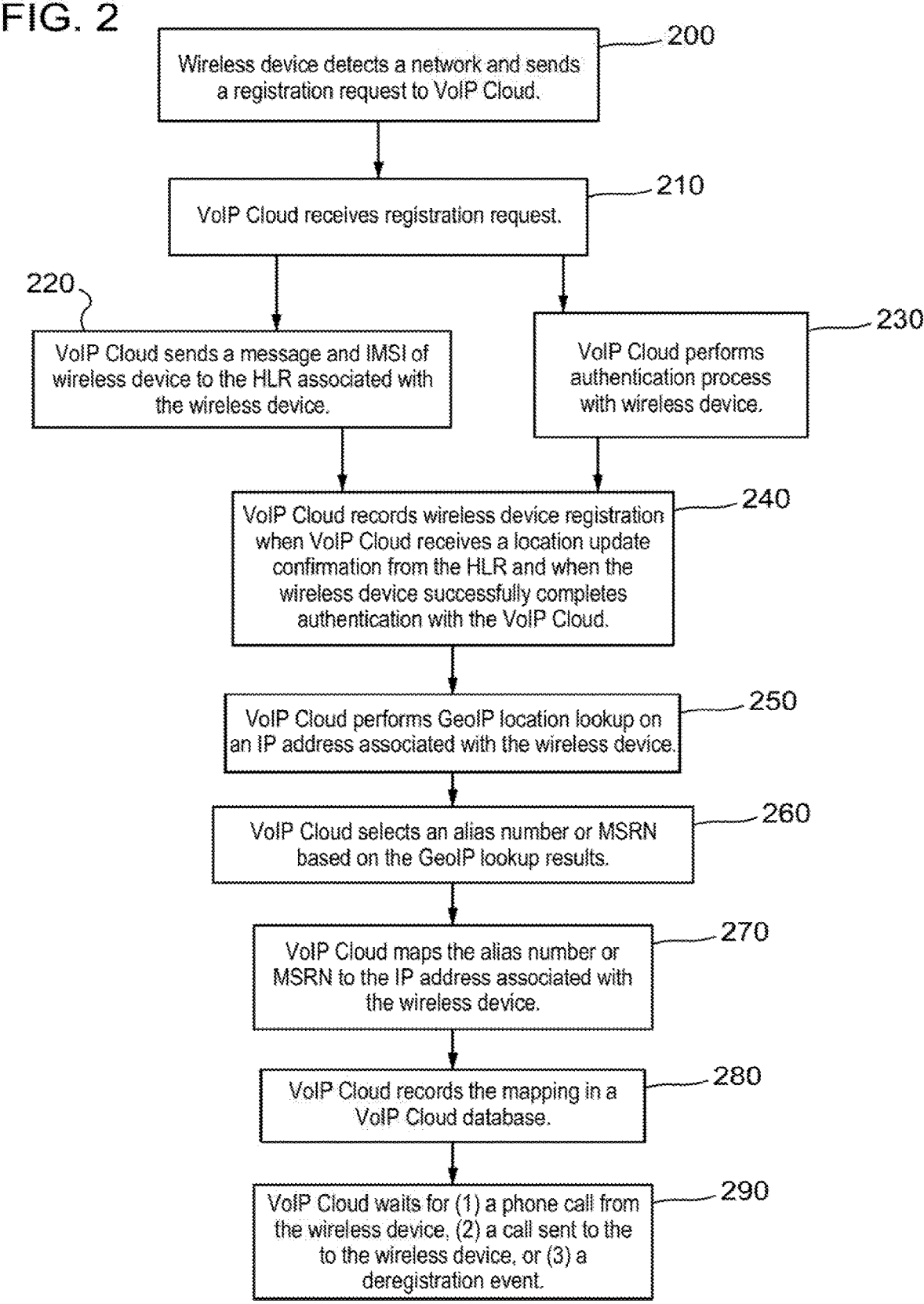
FIG. 2 is a flowchart of one embodiment of a registration process for accessing a network system.

FIG. 2 is a flowchart that depicts one embodiment of a device registration, such as Wireless Device 100 registering with VoIP Cloud 160. At step 200, a wireless device is specifically configured to detect that it is in communication range of a particular type of network (such as a WiFi, Bluetooth, or other suitable network). In one embodiment, if the network is in communication with the public Internet, the wireless device is specifically configured to send a registration request to a VoIP Cloud. In an alternative embodiment, the network may be in communication with the VoIP Cloud through another private network. In this alternative embodiment, the wireless device sends the registration request to the VoIP Cloud through the network and the other private network. At step 210, the VoIP Cloud receives the registration request from the wireless device. As noted above in other embodiments, the registration request may include numerous different identifiers associated with the wireless device. For example, the identifiers may include, among other things, an IMSI, an MSISDN, and an Internet Protocol (IP) address associated with the wireless device. The VoIP Cloud processes the registration request, which may include storing the numerous different identifiers associated with the wireless device in a database associated with the VoIP Cloud. At step 220, the VoIP Cloud sends a message to the HLR associated with the wireless device. For example, the VoIP Cloud may send a Send IMSI message along with the wireless device's IMSI to the HLR associated with the wireless device. When the HLR receives this message with the wireless device's IMSI, the HLR (and a Home MNO associated with the wireless device) may send a message back to the VoIP Cloud with more information on the wireless device. The message from the HLR may include the MSISDN of the wireless device that the HLR stored in its records. At step 230 (before, during, or after step 220), VoIP Cloud performs an authentication process with the wireless device. In one embodiment, the authentication process is based on a Session Initiation Protocol (SIP) authentication process. As part of the authentication process, VoIP Cloud may compare information received from the HLR to information received from the wireless device to confirm the identity of the wireless device for authentication purposes.

In one embodiment, as shown in step 240, the VoIP Cloud waits for response from the HLR based on the update location message and waits for the appropriate authentication response from the wireless device. When the VoIP Cloud receives a location update confirmation from the HLR and receives the appropriate authentication response from the wireless device, the VoIP Cloud records the wireless device's registration in the VoIP Cloud registration database.

In step 250, the VoIP Cloud performs a GeoIP location lookup on the wireless device. That is, the VoIP Cloud uses the IP address of the wireless device to determine the approximate physical location of the wireless device. For example, the VoIP Cloud may determine that the wireless device is located approximately in Chicago, Ill.

In step 260, once the VoIP Cloud determines the approximate physical location of the wireless device, the VoIP Cloud selects a temporary alias number, an MSRN, or an LNS based on the GeoIP lookup result on the IP address of the wireless device. That is, if the IP address of the wireless device is determined to be associated with the approximate physical location of Chicago, Ill., the VoIP Cloud may select a temporary alias number or an MSRN associated with the physical location of Chicago, Ill. (e.g., a phone number that includes the area code 312). In one embodiment, it should be appreciated that the temporary alias number may alternatively be an MSRN or LNS number, as discussed above.

Selecting a geographically appropriate temporary number enables the VoIP Cloud to route a call (or otherwise cause the call to be routed) to the wireless device through an ingress point on a telephony network associated with the VoIP Cloud that is closest to the Home MNO/HLR. The selected geographically appropriate temporary number also enables the VoIP Cloud to route the call (or otherwise cause the call to be routed) through the telephony network associated with the VoIP Cloud to an egress point that is closest to the wireless device. In other words, the VoIP Cloud causes or forces the call to remain on the telephony network associated with the VoIP Cloud for as long as possible to control the quality of the call data transmission. Where the telephony network associated with the VoIP Cloud provides a high quality of service (QoS) to the call data transmission, the VoIP Cloud's routing decision decreases latency, jitter, and packet loss, which results in improved call quality over a low-cost network. It should be appreciated that once call setup signaling is complete, call media may not be sent through the VoIP Cloud. Rather, the call media may be sent through telephony switches or gateways in the telephony network associated with VoIP Cloud. Thus, VoIP Cloud may cause a call to be transmitted to the wireless device based on the selected geographically appropriate temporary number (e.g., and ultimately transmitted through a local area network).

In step 270, the VoIP Cloud maps the selected temporary alias number or MSRN to the IP address of the wireless device. The mapping allows the VoIP Cloud to determine and direct where to route a call on an IP network when the call is sent to the temporary number. In step 280, the VoIP Cloud records the mapping in a VoIP Cloud database. At step 280, the wireless device is registered with the VoIP Cloud system. Once the registration of the wireless device is complete, at step 290, the VoIP Cloud waits for (1) a phone call from the wireless device to a call destination, (2) a call sent to the wireless device from a call origination point, or (3) a deregistration event. In one embodiment, the deregistration event includes a situation where the wireless device leaves the communication range of the network (such as a WiFi network that caused the wireless device to register with the VoIP Cloud).

Figure 3:
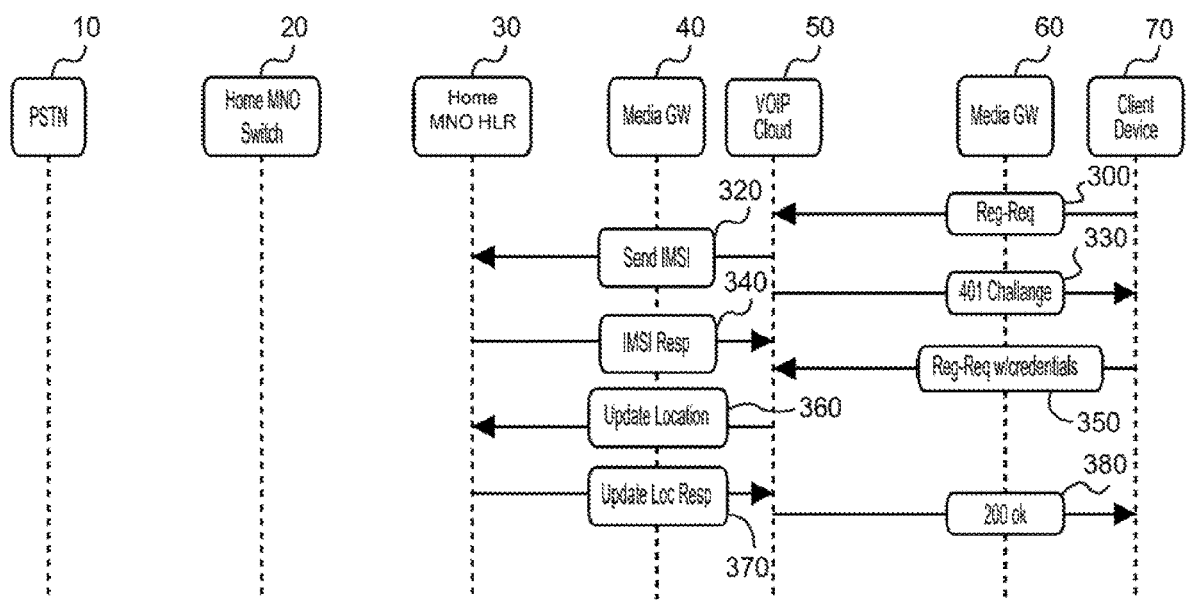
FIG. 3 is a diagrammatic view of a call signaling flow of one embodiment of a registration process for accessing a network system.

FIG. 3 is a diagrammatic view of one specific embodiment of a call signaling flow for registration of a client device, such as Wireless Device 100, discussed above in relation to FIG. 1 and FIG. 2. In one such embodiment, a Public Switched Telephone Network (PSTN) 10 is in communication with a Home MNO Switch 20. For example, PSTN 10 is a circuit switched network that permits end users to make and receive voice calls, as discussed above in connection with PSTN 122 in FIG. 1. Home MNO Switch 20 may be a telephony switch or media switch capable of communicating with TDM or IP networks to transmit and receive voice calls, or other data as discussed above in connection with network element 124 in FIG. 1. While PSTN 10 and Home MNO Switch 20 are not used during the discussion of the registration process, these network systems and elements may be used in a call setup, call media transmission, and call termination discussed that are discussed in more detail below. Home MNO Switch 20 is in communication with a Home MNO HLR 30. Home MNO Switch 20 is also in communication with a Media Gateway (GW) 40. The devices and functions of Media Gateway 40 were discussed above in relation to Network Element 140 in FIG. 1 The functions of the Home MNO HLR 30 were discussed above in relation to network element 130 in FIG. 1. It should be appreciated that the Home MNO HLR 30 may also function as a VLR for visiting wireless devices on Home MNO's network. The functions of a VLR were discussed above in relation to FIG. 1. The Home MNO HLR 30 is in communication with a VoIP Cloud 50. The functions and devices of VoIP Cloud 50 were discussed above in relation to VoIP Cloud 160 in FIG. 1. The Media Gateway 40 is in communication with VoIP Cloud 50 and Media Gateway 60. The devices and functions of Media Gateway 60 were discussed above in relation to network element 175 in FIG. 1. The VoIP Cloud 50 and Media GW 60 are in communication with Client Device 70. The devices and functions of Client Device 70 are discussed above in relation to Wireless Device 100 in FIG. 1.

In one embodiment, as shown in FIG. 3, when Client Device 70 detects that it is in communication range of a particular type of network (such as a WiFi, Bluetooth, or other suitable network, which are not shown), Client Device 70 is specially configured to send a registration request 300 to a VoIP Cloud 50. For example, the registration request may be a SIP Register request message or other suitable message. The registration request 300 from Client Device 70 may traverse a WiFi network and the public Internet (not shown) to reach VoIP Cloud 50. Upon receipt of the registration request 300 from Client Device 70, VoIP Cloud 50 may send a message 330 to Home MNO HLR 30. The message 330 may be an SS7 message such as Send IMSI. VoIP Cloud 50 may also send an authentication challenge message 330 to Client Device 70. The authentication challenge message 330 may include a SIP 401 challenge request.

Upon receipt of the message 320, Home MNO HLR 30 may send a response message 340 to VoIP Cloud 50. The response message 340 may include an SS7 based IMSI Response message. In response to the authentication challenge message 330, Client Device 70 may send a registration request response 350 with credentials back to VoIP Cloud 50. The registration request response 350 may include a SIP response with encrypted user information (including, for example a user name and password) associated with a user of Client Device 70. When VoIP Cloud 50 receives the appropriate message 340 from Home MNO HLR 30 and the appropriate message 350 from Client Device 70. VoIP Cloud 50 may compare data from Client Device 70 and the Home MNO HLR 30 to determine if certain data matches (e.g., the MSISDN from Client Device 70 and the MSISDN from Home MNO HLR 30, as well as other information). If appropriate matches are determined, VoIP Cloud 50 may send a message 360 to Home MNO HLR 30. The message 360 may include an SS7 based Update Location message. As noted above, Home MNO HLR 30 may update its records to store and reflect the new network location of the Client Device 70 based on the message 360. Home MNO HLR 30 may send a response message 370 to VoIP Cloud 50. The response message 370 may include an SS7 based Update Location response to confirm that Home MNO HLR 30's records were updated.

As noted above in connection with FIG. 2, VoIP Cloud 50 may also perform a GeoIP location lookup and map a temporary phone number to the IP address of the Client Device 70. Since this process is not part of the telephony signaling, this process is not shown in FIG. 3.

Once the registration of the wireless device is complete, VoIP Cloud 50 sends a message 380 to Client Device 70. The message 380 may include a SIP 200 OK response, which lets Client Device 70 know that the registration process is complete and that Client Device 70 may receive calls using the telephony system associated with VoIP Cloud 50. It should be appreciated that the GeoIP location lookup and mapping the temporary phone number to the IP address of the Client Device 70 may occur before, during, or after the message 380 is sent to Client Device 70. Once the registration process of FIG. 3 is complete, Client Device 70 can send and receive calls over the telephony system associated with VoIP Cloud 50. Such calls over the telephony system associated with VoIP Cloud 50 enable the Client Device 70 to send and receive calls using the regular phone number that the Home MNO assigned to Client Device 70. This also enables Client Device 70 to send and receive phone calls to and from any MNOs and PSTN while using Client Device 70's regular phone number. This type of calling with VoIP Cloud 50 occurs without requiring that Client Device 70 and a calling/called party have the same communication application software. That is, Client Device 70 may send and receive calls with industry standard telephone endpoints (fixed line phones on a PSTN and cellular phones on an MNO network) without being connected to a typical telephony network, while connected to a lower cost network, and while using Client Device 70's regular phone number. It should also be appreciated, as discussed above, if Client Device 70 leaves the communication range of a network that triggered the registration process discussed in FIG. 3, this may trigger VoIP Cloud 50 performing a deregistration event for Client Device 70. The deregistration process was discussed above in connection with FIG. 1.

Figure 4:
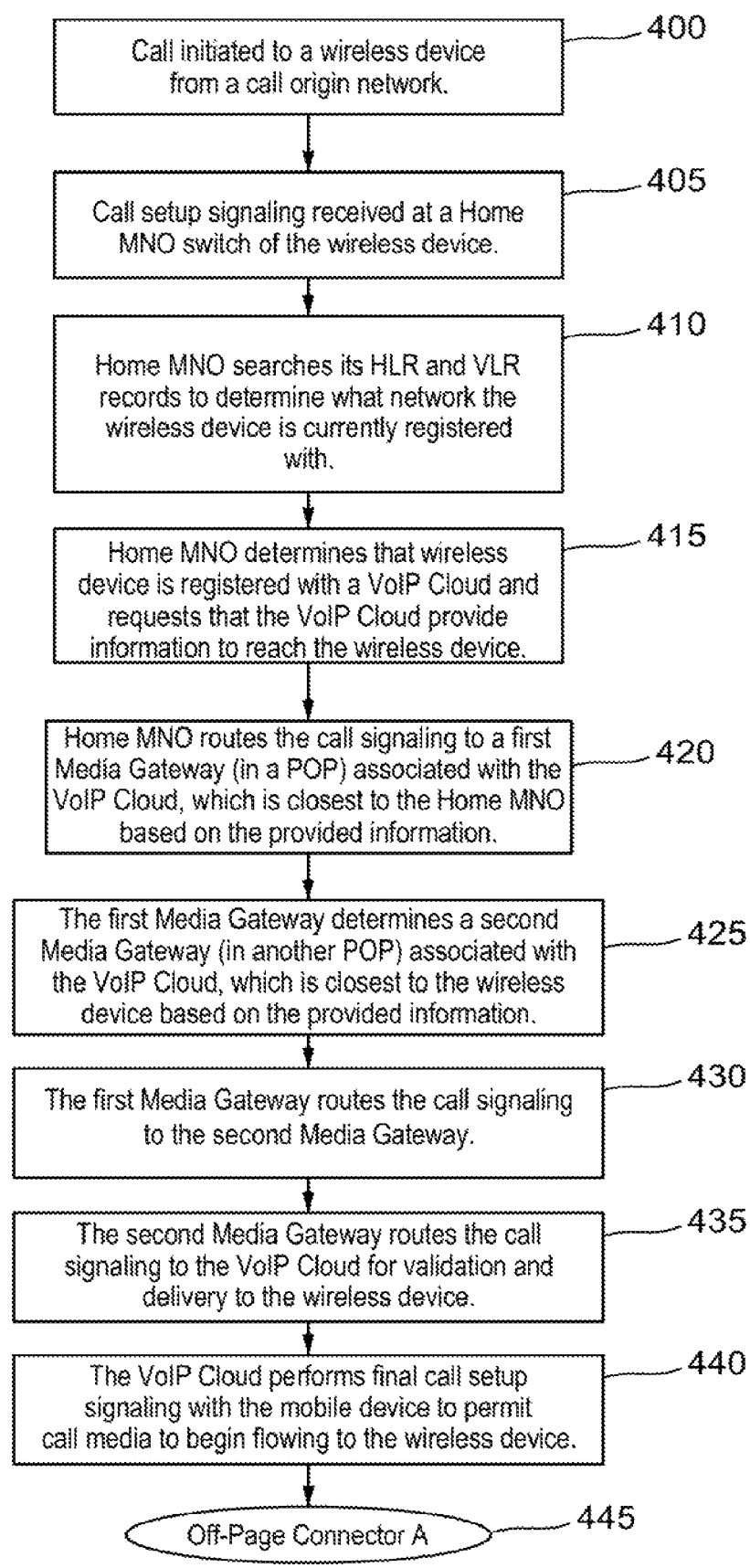
FIG. 4 is a flowchart of one embodiment of a call initiation process for accessing a network system.

FIG. 4 is a flowchart that depicts one embodiment of a call initiation process using the telephony system associated with VoIP Cloud 50 discussed in FIGS. 1-3. At step 400, a call from a network node on a call origin network (such as a fixed line telephone on a PSTN or a mobile device on an MNO's network) is initiated to a wireless device (such as Client Device 70) associated with the Home MNO. In this embodiment, the wireless device is roaming and registered with VoIP Cloud 50. At step 405, a Home MNO Switch (such as Home MNO switch 20) receives call setup signaling from the call origin network (e.g., because the Home MNO Switch is associated with the Home cellular network of Client Device 70). At step 410, the Home MNO Switch searches its stored HLR and VLR records (e.g., stored with the Home MNO HLR 30) to determine whether the wireless device is registered and located on the Home MVO's network or registered and located on a visited (roaming) network. In this embodiment, as noted above and in step 415, Home MNO HLR 30's records indicate that wireless device is roaming and using the telephony services of a telephony network associated with VoIP Cloud 50. Home MNO HLR 30 may also send a request to the VoIP Cloud 50 to provide information necessary to complete the call initiation signaling process as shown in step 415. The request may include an SS7 Location Request. Whereas the response from VoIP Cloud 50 may include an SS7 Location Response with, among other information, an MSRN or alias phone number for the wireless device. In step 420, the Home MNO routes the call signaling to a first Media Gateway (such as Media GW 40 and/or a Telephony Switch 140 in POP 135) based on the response from VoIP Cloud 50. For example, where the response includes an MSRN, the MSRN indicates to the Home MNO which network can receive the call setup signaling for the wireless device. In this example, the first Media Gateway is associated with the VoIP Cloud 50 and may also be the closest media gateway to the Home MNO that is associated with VoIP Cloud 50.

In step 425, the first Media Gateway determines a second Media Gateway (such as Media GW 60 and/or a media gateway in POP 170) to receive the call setup signaling. In one embodiment, the first and second Media Gateways are connected on the same network and are associated with the telephony network of VoIP Cloud 50. In one embodiment, the first and second Media Gateways are in communication over a private network and do not need to communicate with each other over the public Internet, which allows faster and more reliable communication between the Media Gateways. In one embodiment, to determine the appropriate second Media Gateway to select to route the call setup signaling, the first Media Gateway may rely on a locally stored table of call routes to determine that the second Media Gateway is the closest media gateway to the wireless device. In an alternative embodiment, the first Media Gateway may send a routing query request to a dedicated route server (such as the routing server 150 in route system 145 discussed above in FIG. 1). The routing server 150 may send a message back to the first Media Gateway with one or more call routes to use to reach the wireless device. In one such embodiment, the message from routing server 150 may indicate that the second Media Gateway is the closest media gateway on the telephony system associated with the VoIP Cloud 50 to reach the wireless device. At step 430, the first Media Gateway routes the call signaling to the second Media Gateway.

At step 435, the second Media Gateway determines that VoIP Cloud 50 is the next hop in the call setup signaling route (including for validation and delivery) to the wireless device based on the MSRN or alias number assigned to the wireless device. At step 440, the VoIP Cloud 50 receives the MSRN or alias number when receiving the call setup signaling from the second Media Gateway. In one embodiment, the VoIP Cloud 50 searches a database for a mapping between the MSRN or alias number and an IP address of a wireless device. Based on the results of the search, if VoIP Cloud 50 finds a mapping to an IP address, the VoIP Cloud 50 may contact the wireless device to complete the final portions of the call setup signaling to the wireless device. Once the call setup signaling has completed and the call from the origin network has been terminated (i.e., connected) to the wireless device, call media (the voice payload) may begin flowing to the wireless device and from the wireless device to the network node on the origin network that originated the call. Off-page connector 445 links to the flow chart in FIG. 6 detailing the call media flow between the wireless device and the origin network. It should be appreciated that a certain level of call signaling detail was not discussed in FIG. 4. However, such detail is covered below in FIG. 5 with respect to a more specific embodiment detailing the call setup signaling used in the call initial process of FIG. 4.

It should also be appreciated, that the call initiation process would be similar, but somewhat reversed, if the wireless device discussed in this embodiment initiated the call. The details of this reversed call initiation process should be apparent based on the descriptions of FIG. 4 and FIG. 5.

Figure 5:
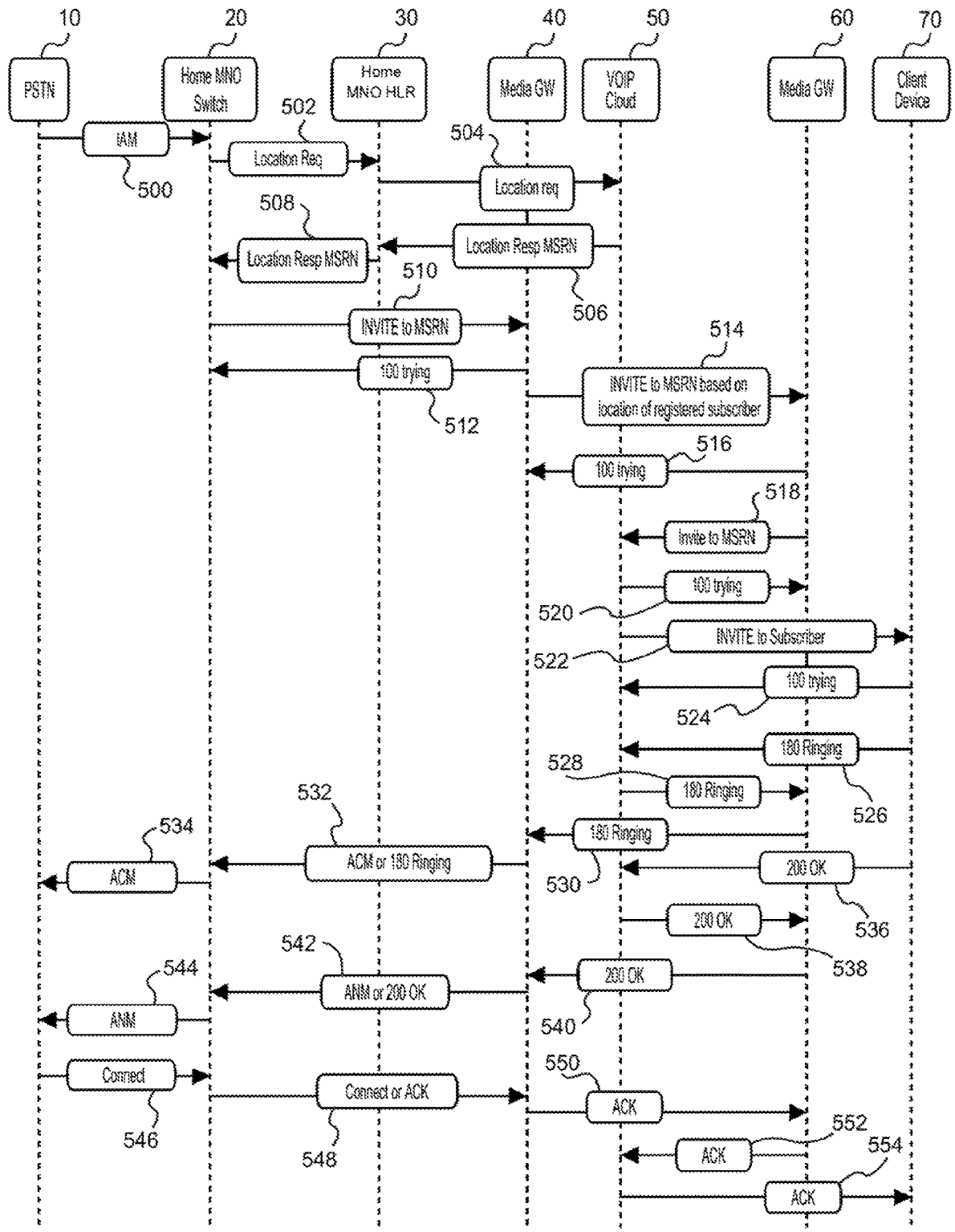
FIG. 5 is a diagrammatic view of a call signaling diagram of one embodiment of a call initiation process for accessing a network system to transmit and receive wireless calls over different networks.

FIG. 5 is a diagrammatic view of one specific embodiment of a call setup signaling flow to a Client Device 70, such as Wireless Device 100, discussed above in relation to FIGS. 1-4. The PSTN 10 (such as a media gateway positioned at the network edge of PSTN 10) transmits a message 500 to Home MNO Switch 20 to signal the start of a call setup process. The message 500 may be an SS7 call setup signaling message Initial Address Message (IAM). The message 500 may contain information such as a called number, a type of service (speech or data), and other optional parameters. As noted above, the message 500 may be sent to Home MNO Switch 20 because the Home MNO Switch 20 is the home network for Client Device 70. Home MNO Switch 20 determines the location and network that the Client Device 70 is currently registered with. As shown in FIG. 5, Home MNO Switch 20 may send a message 502 to Home MNO HLR 30 to make this determination. The message 502 may be a Location Request message. If Home MNO HLR 30 determines that Client Device 70 is roaming, Home MNO HLR 30 will send a message 504 to the VLR of the network where Client Device 70 is registered and roaming. As shown in FIG. 5, Home MNO HLR 30 sends a message 504 to the VoIP Cloud 50 because VoIP Cloud 50 is listed as the VLR for the visited network where Client Device 70 is roaming. If Client Device 70 is registered with VoIP Cloud 50, VoIP Cloud 50 may send a message 506 back to Home MNO HLR 30. The message 506 may be a Location Response including an MSRN or alias phone number stored in association with Client Device 70 and any other information necessary to direct the call signaling to Client Device 70. Upon receipt of the message 506, Home MNO HLR 30 may send a message 508 to Home MNO Switch 20 based on message 506. The message 508 may be a Location Response including an MSRN or alias phone number that is associated with Client Device 70.

Based on the message 508, Home MNO Switch 20 determines what next media gateway switch should receive the call setup signaling for the call to Client Device 70. The determination may be based on locally stored routing information or information from a dedicated call route server. As shown in FIG. 5, Home MNO Switch 20 selects Media GW 40 as the next node in the call signaling route and sends a message 510 to Media GW 40. The message 510 may be an Invite to MSRN message. Upon receipt of the message 510, Media GW 40 may send a message 512 back to Home MNO Switch 20. The message 512 may be a 100 trying message to indicate receipt of the message 510. Upon receipt of the message 510, Media GW 40 determines what next media gateway switch should receive the call setup signaling for the call to Client Device 70. The determination may be based on locally stored routing information or information from a dedicated call route server. In one embodiment, as discussed in FIG. 4, a specialized route server may be used to provide the call routing information. In one embodiment, the temporary MSRN or alias phone number identifies the Client Device 70's approximate physical location and/or the visited network. In alternative embodiments, the call route may be determined based on the physical location and roaming network of Client Device 70. The call route may also be determined using least cost routing, based on the shortest route to Client Device 70, other suitable route determination methods, or some combination of one or more of the foregoing. In one embodiment, where the shortest route path is used as a criterion, the shortest route calculation includes determining how to minimize the amount of time and distance the call setup signaling (and eventually, call media) spends on the public Internet before reaching Client Device 70.

Once the next media gateway is determined, Media GW 40 sends a message 514 to the appropriate next media gateway. In FIG. 5, the next appropriate media gateway is Media GW 60 based on the MSRN. The message 514 may be an Invite to MSRN message. The Media GW 60 send a message 516 to Media GW 40. The message 516 may be a 100 trying message indicating receipt of message 514 and that Media GW 60 is attempting to route the call setup signaling to the next hop in the call route.

Messages 518-522 relate to Media GW 60 sending the call setup signaling to VoIP Cloud 50 for further validation and delivery to the Client Device 70. As shown in FIG. 5 and based on the MSRN or alias phone number, Media GW 60 determines that VoIP Cloud 50 is the next node in the call route. As such, Media GW 60 sends a message 518 to VoIP Cloud 50. The message 518 may include an Invite to MSRN (or alias phone number). VoIP Cloud 50 may send a message 520 back to Media GW 60 to confirm receipt of the message 518. The message 520 may include a 100 trying message. Upon receipt of the message 518, VoIP Cloud 50 also searches a mapping database for a mapping between the MSRN or alias number and an IP address of a wireless device. Based on the results of the search, if VoIP Cloud 50 finds a mapping between the MSRN or alias number to an IP address, the VoIP Cloud 50 send a message 522 to Client Device 70. The message 522 may include an Invite to Subscriber message. The message 522 may be sent over TCP/IP (e.g., over an IP based network) to Client Device 70. While not shown in FIG. 5, message 522 may be sent to Client Device 70 over the public Internet, such as Internet network 180 in FIG. 1. Message 522 may also be sent through a WiFi network to Client Device 70, such as WiFi Network 190 in FIG. 1. In some embodiments, the message 522 is sent to Client Device 70 over both the public Internet and a WiFi network before reaching Client Device 70. In some embodiments, call signaling messages and call media that reach Client Device 70, are sent through the public Internet, a private network, a WiFi network, or a combination of one or more of the forgoing networks. However, as noted above, in one embodiment, VoIP Cloud 50 attempts to minimize the amount of time and distance call media and call signaling sent to Client Device 70 spend on the public Internet to enable lower latency, jitter, and packet loss and provide higher call quality than is possible if the call media and call signaling spent a significant amount of time traversing the public Internet.

Returning to FIG. 5, when Client Device 70 receives message 522, Client Device 70 may send a message 524 to VoIP Cloud 50. The message 524 may include a 100 trying message. Client Device 70 may also send a message 526 to VoIP Cloud 50. The message 526 may include a 180 Ringing message, which notifies VoIP Cloud 50 that Client Device 70 is attempting to alert the user of the incoming call (e.g., such as through audible ringing of Client Device 70). The message 526 may also trigger a cascade of ring back messages to the network node that initiated the call from PSTN 10 over almost the same call signaling path as described above. As shown in FIG. 5, VoIP Cloud 50 sends a message 528 to Media GW 60, which may include a 180 Ringing message. Media GW 60 sends a message 530 to Media GW 40, which may include a 180 Ringing message. Media GW 40 sends a message 532 to Home MNO Switch 20, which may include a 180 Ringing or ACM message (depending on the type of network that is between Media GW 40 and the Home MNO Switch 20). Home MNO Switch 20 sends a message 534 to the PSTN 10, which may include an Address Complete Message (ACM), which serves a similar purpose to a 180 Ringing message on a circuit switched network.

If the user of Client Device 70 answers the call, Client Device 70 sends a message 536 to VoIP Cloud 50. Message 536 may include a 200 Ok message signaling that call request has succeeded. While not shown, if the user did not answer the call, a different message maybe sent. Alternatively, if no message 536 is sent, VoIP Cloud 50 may generate a message indicating failure of the call. The message 536 may also trigger a cascade of messages signaling that the call from the PSTN 10 to Client Device 70 has succeeded. As shown in FIG. 5, VoIP Cloud 50 sends a message 538 to Media GW 60, which may include a 200 Ok message. Media GW 60 sends a message 540 to Media GW 40, which may include a 200 Ok message. Media GW 40 sends a message 542 to Home MNO Switch 20, which may include a 200 Ok message or an ANM message (Answer Message) (depending on the type of network that is between Media GW 40 and the Home MNO Switch 20). Home MNO Switch 20 sends a message 544 to the PSTN 10, which may include an ANM message.

When the appropriate network node on PSTN 10 receives the message 544, the appropriate network node in the PSTN 10 sends a message 546 to Home MNO Switch 20. The message 546 may include a Connect message, which completes the establishment of a call (call setup signaling). The message 546 may also trigger a cascade of messages signaling that the call from the PSTN 10 to Client Device 70 has connected. When Home MNO Switch 20 receives message 546, Home MNO Switch 20 may send a message 548 to Media GW 40, where the message 548 may include a Connect or Acknowledge (ACK) message (depending on the type of network that is between Media GW 40 and the Home MNO Switch 20). Media GW 40 may send a message 550 to Media GW 60, where the message 550 may include an ACK message. Media GW 60 may send a message 552 to VoIP Cloud 50, where the message 552 may include an ACK message. VoIP Cloud 50 may send a message 554 to Client Device 70, where the message 554 may include an ACK message. At this point, the call is connected and call media may begin flowing between the calling network node on PSTN 10 and Client Device 70. Some embodiments describing the call media flow and the call termination signaling are discussed below in reference to FIGS. 6 and 7.

Figure 6:
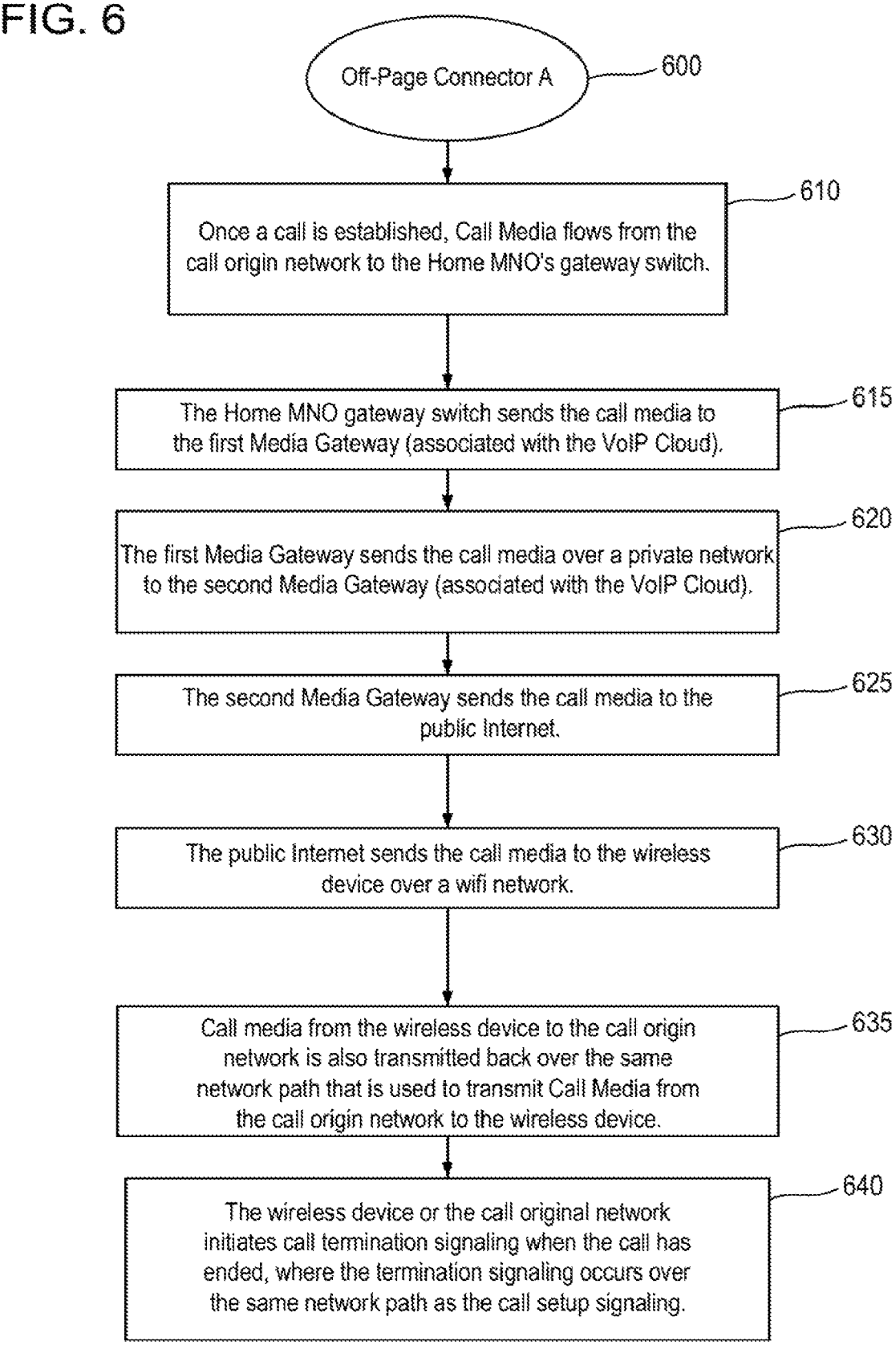
FIG. 6 is a flowchart of one embodiment of a call media transmission process and call termination process of a network system configured to transmit and receive wireless calls over different networks.

FIG. 6 is a flowchart that depicts one embodiment of a call media (voice data) flow or transmission process using the telephony system associated with VoIP Cloud 50 discussed in FIGS. 1-5. Step 600 is an off-page connector that continues from off-page connector 445 in FIG. 4. At step 610 a call from a call origin network to a wireless device was established. Thus, call media is permitted to flow between the call origin network to the wireless device. In the call media flow direction from the call origin network to the wireless device, call media flows from the call origin network to the Home MNO's gateway switch. At step 615, the Home MNO Gateway sends the call media to the first Media Gateway (which is part of the telephony network associated with VoIP Cloud 50). At step 620, the first Media Gateway sends the call media over a private network to the second Media Gateway. The second Media Gateway is also part of the telephony network associated with VoIP Cloud 50. As noted above, the first Media Gateway and the second Media Gateway may be in communication over a fast and efficient private network. Such a private network can enforce network quality of service during call transmissions versus calls that are routed solely over the public Internet or spend more time traversing the public Internet to reach the appropriate destination.

At step 625, the second Media Gateway sends the call media over the public Internet. For example, the call media may be sent over the Internet 180 as shown in FIG. 1 from telephony switch 175 in POP 170. At step 630, the public Internet delivers the call media to a local area network (such as a WiFi network). The local area network delivers the call media to the wireless device.

It should be appreciated that call media flow is bi-directional. As such, at step 635, the wireless device may send call media back to the call origin network. The call media path from the call origin network to the wireless device is the same or similar to the call media path from the wireless device to the call origin network.

When either the network node on the call origin network or the wireless device end the call, at step 640, a call termination signaling process is initiated. In one embodiment, the call termination signaling occurs over the same path as the call setup signaling. It should be appreciated that other events may trigger the call termination signaling. One specific embodiment of the call termination signaling is described in greater detail in connection with FIG. 7 below.

Figure 7:
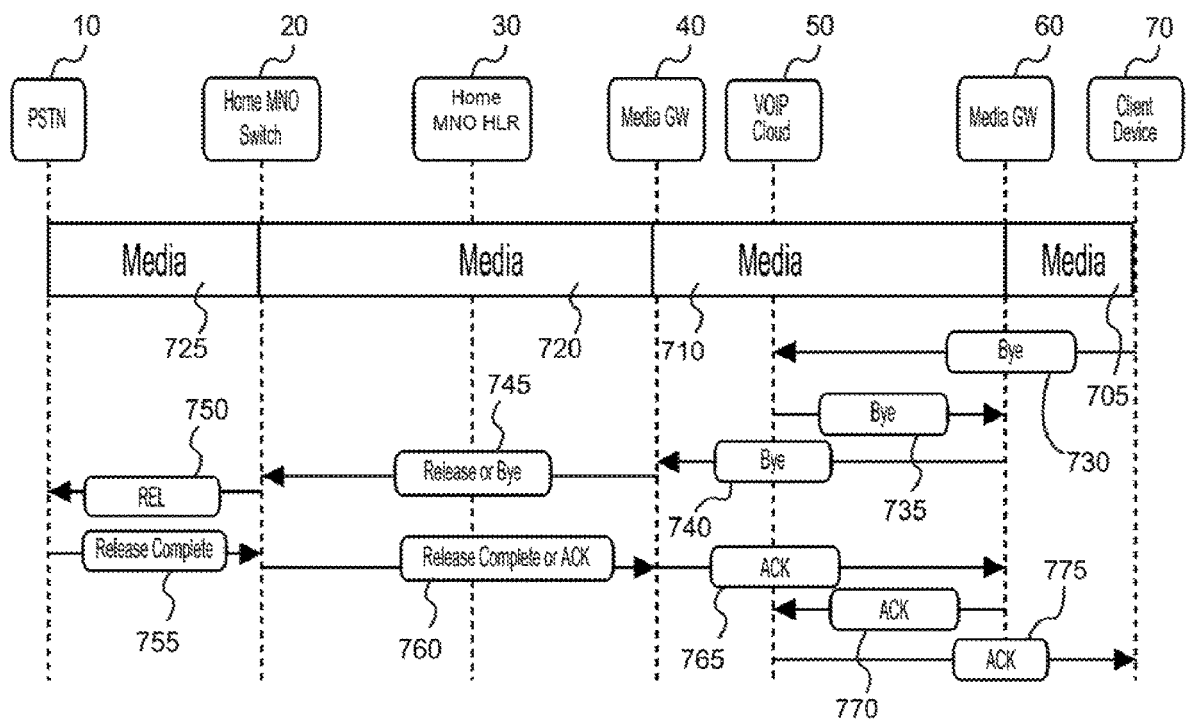
FIG. 7 is a diagrammatic view of a call media transmission and call termination signaling of one embodiment for transmitting and receiving wireless calls over different networks.

FIG. 7 is a diagrammatic view of one specific embodiment of a call media flow between a PSTN 10 (such as PSTN 122 from FIG. 1) and a Client Device 70 (such as Wireless Device 100 from FIG. 1) as well as call termination signaling between these devices, as discussed above in relation to FIGS. 1-6. As noted in FIG. 5, call setup signaling was exchanged between a network node on PSTN 10 and Client Device 70 on a different network (such as a WiFi network) to establish a call. As previously discussed, the call setup signaling traversed various different networks and network devices to establish the call. Once the call is established, in one embodiment, the Client Device 70 may send Media 705 to PSTN 10. Media 700 is a representation of call media (e.g., voice call data) generated at the Client Device 70. To reach PSTN 10, Media 700 may first be sent to Media GW 60. Based on Media GW 60 receiving the media 700, Media GW 60 may send the media 705 as media 710 to Media Gateway 40 (both Media GW 60 and Media GW 40 may be part of the same telephony network associated with VoIP Cloud 50, as noted above). Based on Media Gateway 40 receiving the call media 710, Media GW 40 may send the Media 710 as Media 720 to Home MNO Switch 20 (which is part of the telephony network associated with Client Device 70's home cellular network provider). Based on Home MNO Switch 20 receiving the call media 720, Home MNO Switch 20 may send the Media 720 as Media 725 to the PSTN 10. While not shown, the PSTN may send the Media 725 to the network node (a fixed line phone) in PSTN that originated the call. It should be appreciated that a call generally involves a bi-directional flow of call data. As such, it should be appreciated that as the network node on the PSTN 10 generates and sends call media to Client Device 70, the call media may flow over the same network path as noted above.

In FIG. 7, when either Client Device 70 or the network node ends the call, a call termination signaling procedure is performed. It should be appreciated that other events may trigger call a termination signaling procedure (e.g., loss of local area network connectivity or other network problems). As shown in FIG. 7, Client Device 70 ends the call and initiates the call termination signaling procedure by sending message 730 to VoIP Cloud 50. Message 730 may include a Bye message indicating termination of a dialog and the end of the call. The message 730 may trigger a cascade of messages signaling that the call from the Client Device 70 to PSTN 10 has ended. As shown in FIG. 7, VoIP Cloud 50 sends a message 735 to Media GW 60, which may include a Bye message. Media GW 60 sends a message 740 to Media GW 40, which may include a Bye message. Media GW 40 sends a message 745 to Home MNO Switch 20, which may include a Bye message or a REL (a release) message (depending on the type of network that is between Media GW 40 and the Home MNO Switch 20). Home MNO Switch 20 sends a message 750 to the PSTN 10, which may include an REL message.

When the appropriate network node on PSTN 10 receives the message 750, the appropriate network node in the PSTN 10 sends a message 755 to Home MNO Switch 20. The message 755 may include a Release Complete message, which acknowledges release of the call and the availability of the telephony resources. The message 755 may also trigger a cascade of messages signaling that the call from the PSTN 10 to Client Device 70 has ended and the resources used for the call are idle and available. When Home MNO Switch 20 receives message 755, Home MNO Switch 20 may send a message 760 to Media GW 40, where the message 760 may include a Release Complete or ACK message (depending on the type of network that is between Media GW 40 and the Home MNO Switch 20). Media GW 40 may send a message 765 to Media GW 60, where the message 550 may include an ACK message. Media GW 60 may send a message 770 to VoIP Cloud 50, where the message 770 may include an ACK message. VoIP Cloud 50 may send a message 775 to Client Device 70, where the message 775 may include an ACK message. At this point, call has officially ended. It should be appreciated that other the message flow starting from message 705 may be reversed if the network node on PSTN 10 ended the call to Client Device 70.

It should be appreciated that the signaling messages sent between the different devices shown in the figures herein may change depending on the on the type of network or network device that will receive the message.

In one embodiment, the registration portion of VoIP Cloud 160 and VoIP Cloud 50 systems discussed in connection with FIGS. 1-3 may be used without performing call termination services for the wireless devices (e.g., without enabling a wireless device registered with the VoIP Cloud to send/receive calls over telephony network associated with the VoIP Cloud). That is, the registration may be used for wireless device authentication, where the authentication of a wireless device is used for purposes other than call termination. In one example embodiment, the authentication system may be used to confirm a wireless device has properly activated service with a MNO or is not stolen. In some embodiments, where VoIP or calling services are not provided, the VoIP Cloud 160 and VoIP Cloud 50 may be referred to as an Authentication Cloud, which uses the same or similar network elements and devices as used in VoIP Cloud 160 and VoIP Cloud 50.

The authentication of the wireless device with an MNO using the VoIP Cloud system may enable one or more alternative services to be used on or with the wireless device from a provider of such alternative services other than the MNO and the provider of the VoIP Cloud services. The alternative services may include any suitable services. In one embodiment, the alternative services may include services from an Over The Top (OTT) content or service provider (such as OTT Service Provider 195 in FIG. 1). In one such embodiment, an OTT Service Provider 195 may provide audio, video, and other desirable media or content to wireless devices. In another such embodiment, an OTT Service Provider 195 may provide software, such as operating systems or other software, to wireless devices. Before the OTT Service Provider 195 allows a wireless device to obtain content from the OTT Service Provider 195, the OTT Service Provider 195 may want to determine that the wireless device is authorized or otherwise verify the identity of the wireless device.

In some embodiments, a Home MNO (such as Home MNO 120 from FIG. 1) may have contract with an OTT Service Provider 195 to supply content to the Home MNO's wireless device customers. In one such embodiment, the Authentication Cloud can confirm that a wireless device is authorized before the OTT Service Provider supplies content to the wireless device. The authentication or identity confirmation may prevent the OTT Service Provider 195 from distributing content to unlicensed users. Where the Home MNO 120 does not pay the OTT Service Provider 195 a fixed fee for content, but must pay by the quantity or type of content delivered to the Home MNO's 120 subscribers, the Authentication Cloud may prevent the OTT Service Provider 195 from charging the Home MNO 120 for services by unauthorized users of wireless devices. In another embodiment, the OTT Service Provider 195 may charge the user through the Home MNO for provided services or content. In such a case, the OTT Service Provider 195 may require the Authentication Cloud to verify with the Home MNO 120 that services or content was provided to wireless devices.

In one authentication embodiment in accordance with FIG. 1, if the Wireless Device 100 moves to a position that is within communication range of WiFi Network 190, Wireless Device 100 may contact or request service from OTT Service Provider 195. In one embodiment, the OTT Service Provider 195 is connected to the public Internet 180. In one such embodiment, the Wireless Device 100 sends the request through WiFi Network 190 and the public Internet 180 to reach OTT Service Provider 195. If the OTT Service Provider 195 wants to confirm the identity of Wireless Device 100 before connecting or otherwise providing a service to Wireless Device 100, OTT Service Provider 195 may require authentication with Home MNO 120 associated with the Wireless Device 100. In one embodiment, the request from the Wireless Device 100 includes one or more identifying details of the Wireless Device 100. The details may include the MSISDN of the Wireless Device 100 and other details necessary to authenticate the Wireless Device 100 with VoIP Cloud 160 and the home MNO of Wireless Device 100.

It should be appreciated that Wireless Device 100 may start the authentication process to access service from the OTT Service Provider 195 by directly or independently contacting the VoIP Cloud 160 (as discussed above in other figures). That is, the OTT Service Provider 195 may trigger the authentication process discussed below. In such an embodiment, the VoIP Cloud 160 may later notify the OTT Service Provider 195 of the authentication success or failure of Wireless Device 100.

OTT Service Provider 195 does not have the capabilities to directly perform authentication with Home MNO 120. For example, if the required authentication uses a telephony system, the OTT Service Provider 195 does not have the necessary telephony equipment necessary to communicate with the Home MNO 120's telephony system. Moreover, such a telephony system is generally expensive and complex to acquire and maintain. Thus, it would be beneficial to the OTT Service Provider 195 to interact with the Home MNO 120's telephony system for authentication purposes without requiring the expense and complexity of acquiring and maintaining telephony equipment.

In one embodiment, OTT Service Provider 195 sends a request to VoIP Cloud 160 (based on the contact or request from Wireless Device 100). The request may include some or all of the details the Wireless Device 100 provided to OTT Service Provider 195. These details may include the IMSI and the MSISDN of Wireless Device 100. OTT Service Provider 195 may request VoIP Cloud 160 to perform authentication of the Wireless Device 100 with the home MNO of Wireless Device 100. The request may include the IMSI of the Wireless Device 100. In the FIG. 1 example, the home MNO of Wireless Device 100 is Home MNO 120.

VoIP Cloud 160 may receive the request from OTT Service Provider 195 through an API on webservers 164 in VoIP Cloud 160. The API allows the OTT Service Provider 195 to communicate over a TCP/IP network and request the VoIP Cloud 160 to execute a telephony process that normally requires telephony equipment to perform. In one embodiment, the OTT Service Provider 195 communicates directly with the VoIP Cloud 160 API through a private network. In an alternative embodiment, the OTT Service Provider 195 may communicate with the VoIP Cloud 160 API through the public Internet 180.

When the VoIP Cloud 160 detects the request, VoIP Cloud 160 (such as using VVLR 168) reviews its records to determine the home MNO associated with the Wireless Device 100. In one embodiment, VoIP Cloud 160 sends a request to Routing System 145 to determine the home MNO of Wireless Device 100. In the example shown in FIG. 1, the Routing System 145 determines that the home MNO of Wireless Device 100 is Home MNO 120. The Routing System 145 may send a message to VoIP Cloud 160 indicating that the home MNO is Home MNO 120.

Based on the Routing System 145's message, VoIP Cloud 160 sends a message to Home MNO 120 to confirm information associated with Wireless Device 100. In one embodiment, the VoIP Cloud 160 sends a message to the Home MNO 120 requesting information about the Wireless Device 100 (among other data). The message may include a Send IMSI request. However, the request message may be in any suitable format. If the message from the VoIP Cloud 160 is successfully received at the Home MNO 120, the HLR 130 of the Home MNO 120 sends a message back to the VoIP Cloud 160. The message may include an IMSI response with the MSISDN of the Wireless Device 100. However, any suitable message format may be used. Once the VoIP Cloud 160 receives the message from the HLR 130, VoIP Cloud 160 send a message to the OTT Service Provider 195. The message may include an authentication message. The authentication message may include the MSISDN of the Wireless Device 100. The OTT Service Provider 195 may then compare the MSISDN received from VoIP Cloud 160 to the MSISDN received from the Wireless Device 100 to determine if these numbers match. If the numbers match, the OTT Service Provider 195 may send a message to Wireless Device 100 that authentication is confirmed. The OTT Service Provider 195 may begin providing services to the Wireless Device 100. In an alternative embodiment, based on the authentication information from VoIP Cloud 160, the OTT Service Provider 195 may begin providing services to Wireless Device 100 without sending an authentication message to Wireless Device 100. It should be appreciated that this authentication system is a secure verification of the identity of Wireless Device 100 that avoids less secure systems such as authentication confirmation over Sort Message Service (SMS).

Using the architecture described herein to perform client device registration and permit sending and receiving calls over lower cost and higher quality network paths results in technological improvements over existing systems for a cheaper, more efficient, higher quality, and more secure system.

The above VoIP Cloud architecture is cheaper and more efficient than preexisting systems for several reasons. One reason is that the VoIP Cloud architecture saves the end users (such as roaming cell phone users) from high roaming fees. As noted above, for a cellular network user that roams, the fees for roaming are generally very high and can quickly result in unsustainable costs for a roaming cell phone user (e.g., $0.25/minute). Moreover, the roaming fees on visited cellular networks tend to vary for different countries that a user may visit (e.g., the roaming fee in one country may be $10/day and another country may be $0.25/minute). Using the VoIP Cloud architecture enables the roaming cell phone user to send and receive calls on a much lower cost network associated with the VoIP Cloud. In some embodiments, the rates for using the VoIP Cloud network could be made uniform across different countries.

Another reason that the VoIP Cloud architecture is cheaper and more efficient is that end users (or cellular carriers that subsidize a user's cellular phone purchases) do not need to purchase new hardware to use the VoIP calling on the telephony system associated with the VoIP Cloud. The VoIP Cloud architecture discussed herein works with existing cellular phones that can access low cost networks (such as WiFi networks). The VoIP Cloud architecture discussed herein also enables end users to retain their existing cellular phone number to send and receive VoIP calls on the VoIP Cloud architecture. Existing systems that permit VoIP calling while retaining the end user's phone number require additional hardware features such as HD Voice. These existing systems prevent deployed, preexisting cellular phones from using VoIP calling while retaining the end user's phone number. These existing systems also require additional costs to produce new phones with new hardware to use VoIP calling and retain the end user's phone number. On the other hand, in the VoIP Cloud architecture discussed herein, an existing end user's cellular phone processor can be specially reprogrammed to interoperate with the VoIP Cloud architecture. The VoIP Cloud architecture also enables end users to retain their existing cellular phone number (from their Home MNO) to send and receive calls on their existing, reprogrammed cellular phone. As discussed above, the VoIP Cloud handles the call signaling translations that occurs between different types of networks and handles the mapping of a current IP address of a user's cellular phone to the user's mobile phone number to enable the user to send and receive VoIP calls over the VoIP Cloud architecture. Thus, the VoIP Cloud architecture enables millions of existing phones to gain VoIP calling without expensive hardware upgrades.

Similar to the benefit for end users, the VoIP Cloud architecture also allows MNOs and OTT Service Providers to avoid purchasing new and expensive equipment to enable VoIP calling or authentication for their users. MNOs and OTT Service Providers can maintain their existing network infrastructures and hardware equipment and rely on the centralized VoIP Cloud architecture to communicate with disparate voice networks. Without using the VoIP Cloud architecture, each MNO must purchase new network equipment and new network links to permit VoIP calling like the VoIP Cloud architecture for their users. When applied to the hundreds of MNOs that exist, the new network equipment purchases and new network link acquisitions becomes cost prohibitive and a very inefficient use of money and natural resources.

Similarly, OTT Service Providers do not build and maintain expensive voice networks and equipment capable of interfacing with the networks of MNOs. Without using the VoIP Cloud architecture, each OTT Service Provider must purchase new network equipment and new network links to permit voice signaling exchange standard telephony networks. OTT Service Providers would also be required to negotiate and enter interconnect agreements with every MNO the OTT Service Providers needs to communicate with for the voice signaling exchange. When applied to the multitudes of OTT Service Providers that exist, the new network equipment purchases and new network link acquisitions and interconnect agreements become cost prohibitive and a very inefficient use of money and natural resources. Accordingly, the VoIP Cloud architecture described herein is cheaper and more efficient than upgrading existing systems for MNOs and OTT service providers.

The VoIP Cloud architecture provides a higher quality and more secure calling on low cost networks than existing systems. Existing VoIP calling systems rely primarily on the public Internet to deliver voice calls. The public Internet is a best effort system data delivery system. Quality of service for call data cannot be applied to data sent over the public Internet. On the other hand, the VoIP Cloud architecture minimizes the amount of time and distance call data spends traversing the public Internet. As discussed in detail above, the VoIP Cloud attempts to keep call data on one or more private networks for as long as possible before using the public Internet to deliver the call to a user's cellular phone. The VoIP Cloud causes a call to be routed as early as possible to the one or more private networks. The VoIP Cloud also causes a call to remain on the one or more private networks until the call can be delivered to the closest possible network to an end user's cellular phone. By using the one or more private networks for a greater portion of a call, a quality of service can be applied to a call to ensure lower latency, less jitter, and less packet loss than a call that is delivered primarily or solely over the unsecured public Internet. Avoiding the public Internet (by using private networks) also results in a call that is more secure than a call that is delivered primarily or solely over the public Internet. Accordingly, the VoIP Cloud architecture provides higher quality and more secure VoIP calling on lower cost networks than existing systems.

The above VoIP Cloud architecture is also easier and more efficient because end users can avoid using multiple different low quality communication applications to obtain VoIP calling. An existing way that users can obtain VoIP calling is to download communication applications that permit users to make VoIP calls to other users using the same communication applications. To make the system work, a user must know what communication application is being used by the person the user wants to contact and must obtain the same communication application. Likewise, other people that want to contact the user must also know and obtain the same communication application the user is using. If two people wish engage in a call, but do not have the same communication application, these two people cannot call each other using VoIP. In many instances, end users must obtain many different communication applications so that they can contact different people. Each communication application has its own interface and operates differently from the other communication applications. The communication applications do not allow a user to send and receive calls using the user's existing phone number. Moreover, the communication applications rely solely on the public Internet to deliver VoIP calls between users, which results in a poor-quality connection because the Internet is a best effort service without any quality control. All of these problems with existing communication systems are confusing, frustrating, and result in difficulties for users sending and receiving calls over VoIP. The VoIP Cloud architecture is easier and more efficient because it solves all of these problems. As noted above, the user can use their existing cellular phone and existing cellular number to communicate with other users without having to guarantee that other users have the same communication application. The VoIP Cloud architecture also enables higher quality calls by avoiding the public Internet for most of the call path.

Figure 8:
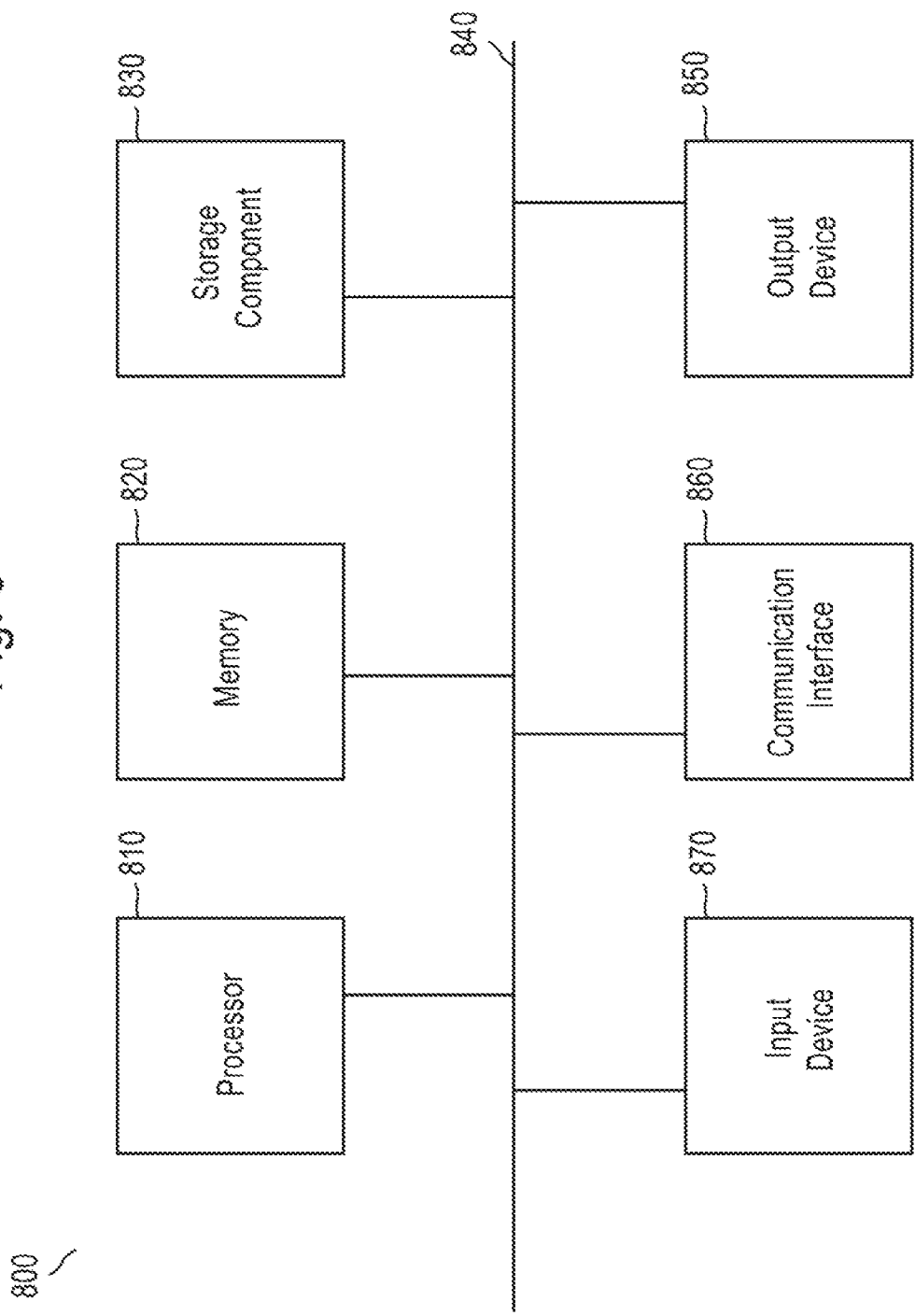
FIG. 8 is a diagram of example components of computing devices of a VoIP Cloud and wireless devices.

FIG. 8 is a diagram of components of a computing device 800 which may be used to implement various computer devices of the systems and methods described in this document, such as the devices of VoIP Cloud 50, VoIP Cloud 160, Client Device 70, Wireless Device 100, Routing System 145, POP 135, and POP 170, as either as client devices or as a server or a plurality of servers. Computing devices are intended to represent various forms of digital computers, such as laptops, desktops, workstations, personal digital assistants, servers, blade servers, mainframes, and other appropriate computers. Other computing devices may include various forms of mobile devices, such as personal digital assistants, cellular telephones, smartphones, and other similar computing devices. The components shown here, their connections and relationships, and their functions, are meant to be exemplary only, and are not meant to limit embodiments of the inventions described and/or claimed in this document.

In one embodiment, a computing device used herein may include a specially configured processor 810, memory 820, a storage component 830, a high and low speed interfaces and buses 840 connecting to the memory. Each of the components of the computing devices are interconnected using various busses, and may be mounted on a common motherboard or in other manners as appropriate. The processor can process instructions for execution within the computing device, including instructions stored in the memory or on the storage device to display graphical information for a graphic user interface on an external input/output device 850 such as a display. In other embodiments, multiple processors and/or multiple buses may be used, as appropriate, along with multiple memories and types of memory. Also, multiple computing devices may be interconnected, with each device providing portions of the necessary operations (e.g., as a server bank, a group of blade servers, or a multi-processor system).

The processor may be implemented as a chipset of chips that include separate and multiple analog and digital processors. The processor may be implemented using any of a number of architectures. For example, the processor may be an x86 processor or a RISC (Reduced Instruction Set Computer) processor. The processor may coordinate with the other components of the device, such as control of user interfaces, applications run by the device, and wireless communication.

The processor may communicate with a user through a control interface and display interface coupled to a display. The display may be, for example, an LED (Liquid Crystal Display) display, or other appropriate display technology. The display interface may comprise suitable circuitry for driving the display to present graphical and other information to a user. The control interface may receive commands from a user and convert them for submission to the processor. In addition, an external interface may be provided in communication with processor to enable near field communication with other devices. An external interface may provide, for example, for wireless and/or wired communication. Multiple interfaces may also be used.

The memory may store information within the computing device. In one embodiment, the memory is a volatile memory unit or units. In another embodiment, the memory is a non-volatile memory unit or units. The memory may also be another form of computer-readable medium, such as a magnetic or optical disk.

The storage device 830 is capable of providing mass storage for the computing device. In one embodiment, the storage device may contain a computer-readable medium, such as a hard disk device, an optical disk device, or a tape device, a flash memory or other solid state memory device, or an array of devices, including devices in a storage area network or other configurations. The storage device may be anyone of the foregoing and be located remotely, such as in a cloud infrastructure. A computer program product can be tangibly embodied in an information carrier. The computer program product may also contain instructions that, when executed, perform one or more methods, such as those described above. The information carrier is a computer or machine readable medium, such as the memory 820, the storage device 830, or memory on processor 810.

The computing device may be implemented in a number of different forms. For example, it may be implemented as a standard server, or multiple times in a group of such servers. It may also be implemented as part of a rack server system. In addition, it may be implemented in a desktop computer or a laptop computer. Alternatively, components from the computing device may be combined with other components in a mobile device. Each of such devices may contain one or more computing devices. An entire system may be made up of multiple computing devices that communicate with each other and also may execute functions in a parallel processing environment.

The computing devices may communicate wirelessly through communication interfaces 860, which may include digital signal processing circuitry. Communication interfaces may provide for communications under various modes or protocols, such as GSM, SMS, CDMA, among others. Such communication may occur, for example, through a radio-frequency transceiver. In addition, short-range communication may occur, such as using a Bluetooth, Wi-Fi, or other such transceiver. A GPS (Global Positioning System) receiver module may provide additional navigation and location related wireless data to the computing devices.

The computing devices may communicate audibly using an audio codec, which may receive spoken information from a user and convert it to usable digital information. The audio codec may likewise generate audible sound for a user, such as through a speaker. Such sound may include sound from voice telephone calls and may include recorded sound.

Various embodiments of the systems and techniques described here can be realized in digital electronic circuitry, integrated circuitry, specially designed ASICs (application specific integrated circuits), computer hardware, firmware, and/or combinations thereof. These various embodiments can include embodiments that are executable and/or interpretable on a programmable system including at least one programmable processor, which are special purpose computers for performing the functions of the VoIP Cloud and wireless devices, coupled to receive data and instructions from, and to transmit data and instructions to, a storage system, at least one input device, and at least one output device.

To provide for interaction with a user, the systems and techniques described here can be implemented on a computer having any suitable display device for displaying information to the user and an input device 870 (e.g., a keyboard, a touchpad, touchscreen, a mouse, or a trackball) by which the user can provide input to the computer. Other kinds of devices can be used to provide for interaction with a user as well. Feedback provided to the user can be any form of sensory feedback (e.g., visual feedback, auditory feedback, or tactile feedback). Input from the user can be received in any form, including acoustic, speech, or tactile input.

The computing system can include clients and servers. A client and server are generally remote from each other and typically interact through a communication network. The relationship of client and server arises through computer programs running on the respective computers and having a client-server relationship to each other.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible. Some process steps may be executed in different order from the specific description herein based on, for example, considerations of function, purpose, conformance to standard, legacy structure, user interface design, and the like.

A number of embodiments of the invention have been described. It should be understood that various modifications may be made without departing from the spirit and scope of the invention. For example, various forms of the flows shown above may be used, with steps re-ordered, added, or removed. Also, although several embodiments of authorizing a remote terminal or mobile device have been described, it should be recognized that numerous other applications are contemplated. Accordingly, other embodiments are within the scope of the following claims.

What is claimed:

1. A telecommunications system comprising:
a processor; and
a memory device that stores a plurality of instructions, which when executed by the processor, causes the processor to operate to:
receive a registration request from a wireless device, the registration request comprising a first international subscriber directory number (MSISDN) and an internet protocol (IP) address associated with the wireless device;
authenticate, with a home location register (HLR) server associated with the wireless device, an identity of the wireless device;
perform a lookup in a database, using the IP address of the wireless device, to determine a geographic location of the wireless device;
obtain a temporary phone number that correlates with the geographic location and map the temporary phone number to the IP address;
store the map of the temporary phone number to the IP address; and
cause a call to be transmitted to the wireless device through a local area network.

2. The telecommunications system of claim 1, wherein the IP address is associated with the local area network.

3. The telecommunications system of claim 1, wherein the wireless device is in direct communication with the local area network and does not receive the call over a cellular network.

4. The telecommunications system of claim 1, wherein the call originated from a cellular network or a circuit switched network and is transmitted to the wireless device over an IP network.

5. The telecommunications system of claim 1, wherein the IP network is a WiFi based network.

6. The telecommunications system of claim 1, wherein authenticating the identity of the wireless device further comprises:
transmitting, to the HLR server associated with the wireless device, a request for a first international mobile subscriber identity (IMSI) based on the first MSISDN from the registration request;
receiving, from the HLR server, a second IMSI and a second MSISDN stored in association with the wireless device at the HLR; and
determining if the first MSISDN matches with the second MSISDN.

7. The telecommunications system of claim 1, wherein the processor is further operated to receive, from the HLR, information comprising a visitor location register (VLR) where the wireless device is currently registered.

8. The telecommunications system of claim 7, wherein the processor is further operated to transmit, to the HLR, a message that the wireless device is currently registered with a virtual visitor location register (VVLR) associated with the telecommunication system.

9. The telecommunication system of claim 8, wherein the processor is further operated to receive, from the HLR, a message indicating that the HLR updated a network location of the wireless device to the telecommunication system associated with the VVLR.

10. The telecommunications system of claim 8, wherein the processor is further operated to determine if the wireless device is still registered with the VVLR,
wherein if the wireless device is still registered with the VVLR, the processor is further operated to periodically transmit, to the HLR, a message that the VVLR is the current VLR for the wireless device.

11. The telecommunications system of claim 8, wherein the processor is further operated to determine if the wireless device is still registered with the VVLR,
wherein if the wireless device is not registered with the VVLR, the processor is further operated to accept the message from the HLR and take no further action.

12. The telecommunication system of claim 1, wherein the processor is further operated to determine whether the wireless device is within range of a WiFi network.

13. The telecommunication system of claim 12, wherein when the processor determines that the wireless device is not within range of a WiFi network, the processor is further operated to deregister the wireless device from a virtual visitor location register (VVLR).

14. The telecommunication system of claim 13, wherein the deregistration of the wireless device further comprises:
allowing a predetermined amount of time to elapse upon determining that the wireless device is not within range of the WiFi network;
determine if a cancellation message is received from the HLR during the predetermined amount of time;
if a cancellation message is received from the HLR during the predetermined amount of time, store in a database an indication that the wireless device is deregistered and close any open communication sessions associated with the wireless device; and
if a cancellation message is not received from the HLR during the predetermined amount of time, transmit a message to the VVLR requesting a mobile station roaming number (MSRN) of the wireless device.

15. The telecommunication system of claim 14, wherein the message to the VVLR to determine the MSRN is sent via a mobile application part (MAP) provide roaming number (PRN) message.

16. The telecommunications system of claim 1, wherein the call to be transmitted is first sent to the HLR from a public switched telephone number or a cellular network using the first MSISDN.

17. A telecommunications server comprising:
at least one processor; and
at least one memory device that stores a plurality of instructions, which when executed by the at least one processor, causes the at least one processor to operate to:
   receive a registration request from a wireless device, the registration request comprising a first international subscriber directory number (MSISDN) and an internet protocol (IP) address associated with the wireless device;
   transmit, to a home location register (HLR) server associated with the wireless device, a request for a first international mobile subscriber identity (IMSI) based on the first MSISDN from the registration request;
   receive, from the HLR server, a second IMSI and a second MSISDN stored in association with the wireless device;
   determine if the first MSISDN matches with the second MSISDN;
   perform a lookup in a first database, using the IP address of the wireless device, to determine a geographic location of the wireless device;
   obtain, from a second database storing a plurality of phone numbers, a temporary phone number, where the temporary phone number is associated with the determined geographic location;
   store, in a third database, an association between the temporary phone number and the IP address of the wireless device;
   store, in the third database, a confirmation that the wireless device is registered;
   receive, from the HLR server, a request to route a call to the temporary phone number;
   obtain, from the third database, an IP address associated with the temporary phone number; and
   cause the call to be transmitted to the wireless device through a local area network based on the IP address.

18. The telecommunication server of claim 17, wherein causing the call to be transmitted to the wireless device further comprises:
   determining a media switch that is geographically closest to the wireless device; and
   directing the media switch to transmit the call to the wireless device through a public Internet and the local area network to the wireless device.

19. The telecommunication server of claim 17, wherein the call is sent from a first media switch of a home mobile network operator associated with the wireless device to a second media switch associated with the telecommunications server,
   wherein the at least one processor is further operable to:
      cause the call to remain on a private network associated with the telecommunication server;
      determine a third media switch that is geographically closest to the wireless device; and
      cause the third media switch to transmit the call to the wireless device through a public Internet and the local area network to the wireless device.

* * * * *